(12) United States Patent
Herrington et al.

(10) Patent No.: US 6,524,475 B1
(45) Date of Patent: Feb. 25, 2003

(54) PORTABLE WATER DISINFECTION SYSTEM

(75) Inventors: Rodney E. Herrington, Albuquerque, NM (US); Curtis M. Mitchke, Albuquerque, NM (US); John K. Hickerson, Albuquerque, NM (US); Timothy A. Cushman, Sandia Park, NM (US); John F. White, Rio Rancho, NM (US)

(73) Assignee: Miox Corporation, Albuquerque, NM (US)

(*) Notice: Subject to any disclaimer, the term of this patent is extended or adjusted under 35 U.S.C. 154(b) by 0 days.

(21) Appl. No.: 09/579,178

(22) Filed: May 24, 2000

Related U.S. Application Data

(63) Continuation-in-part of application No. 09/514,431, filed on Feb. 28, 2000, and a continuation-in-part of application No. 09/318,469, filed on May 25, 1999, and a continuation-in-part of application No. 09/318,468, filed on May 25, 1999, now Pat. No. 6,261,464.

(51) Int. Cl.[7] .................................................. C02F 1/46
(52) U.S. Cl. ...................... 210/192; 210/244; 204/194; 204/232; 204/271
(58) Field of Search ............................ 210/192, 244; 204/194, 232, 271

(56) References Cited

U.S. PATENT DOCUMENTS 1,200,165 A 10/1916 Burgess
3,222,269 A 12/1965 Stanton .................. 204/270

(List continued on next page.)

FOREIGN PATENT DOCUMENTS

WO    WO 95/29130    11/1995

OTHER PUBLICATIONS

L. V. Venczel et al, "Inactivation of *Cryptosporidium parvum* cysts and *Clostridium perfringens* Spores by a Mixed–Oxidant Disinfectant and by Free Chlorine" Applied and Environmental Microbiology, Apr. 1997, vol. 63, No. 4, pp. 1598–1601.
Hydro–Photon Inc. web site describing "Steri–Pen". www.hydro–photon.com.

*Primary Examiner*—Betsey Morrison Hoey
(74) *Attorney, Agent, or Firm*—Deborah A. Peacock; Katy C. Fain; Peacock, Myers & Adams, P.C.

(57) ABSTRACT

A portable oxidant generator for generating oxidants suitable for sterilizing contaminated drinking water, thereby providing potable water. The oxidant generator optionally comprises an electrolytic cell and a power supply or source for powering the generator. In a preferred embodiment, the cell holds an electrolyte solution such that the solution contacts an anode and a cathode. The power supply provides electrical charge that is passed to the electrolyte solution and/or other electrolyte substance. In a preferred embodiment of the present invention, the power supply includes an energy storage device that is charged to predetermined voltage. The energy storage device is preferably charged by a generator that converts mechanical energy into electrical energy. The present invention optionally includes an electrolyte storage compartment in the cap. The present invention also optionally includes a total dissolved solids measuring device to determine if the water to be treated requires reverse osmosis filtration to remove high concentrations of ions the water to be treated.

33 Claims, 14 Drawing Sheets

U.S. PATENT DOCUMENTS

| | | | |
|---|---|---|---|
| 3,622,479 A | 11/1971 | Schneider | 204/149 |
| 4,151,092 A | 4/1979 | Grimm et al. | 210/256 |
| 4,219,424 A | 8/1980 | Tamura et al. | |
| 4,290,873 A | 9/1981 | Weaver | 204/228 |
| 4,306,952 A | 12/1981 | Jansen | 204/149 |
| 4,389,311 A | 6/1983 | La Freniere | 210/198.1 |
| 4,496,443 A | 1/1985 | Mack et al. | 204/130 |
| 4,560,455 A | 12/1985 | Porta et al. | 204/130 |
| 4,744,877 A | 5/1988 | Maddock | 204/266 |
| 4,761,208 A | 8/1988 | Gram et al. | 204/95 |
| 4,765,807 A | 8/1988 | Henriksen | |
| 4,786,380 A | 11/1988 | van Duin et al. | 204/95 |
| 4,790,923 A | 12/1988 | Stillman | 204/268 |
| 4,790,946 A | 12/1988 | Jansen | 210/748 |
| 4,976,842 A | 12/1990 | Fowler | 204/252 |
| 5,006,352 A | 4/1991 | Zelenak nee Zoltai et al. | |
| 5,085,753 A | 2/1992 | Sherman | 204/271 |
| 5,295,519 A | 3/1994 | Baker et al. | |
| 5,320,718 A | 6/1994 | Molter et al. | 204/101 |
| 5,480,386 A | 1/1996 | Brohy et al. | 604/131 |
| 5,492,534 A | 2/1996 | Athayde et al. | 604/141 |
| 5,534,145 A | 7/1996 | Platter et al. | 210/90 |
| 5,540,355 A | 7/1996 | Hancock et al. | |
| 5,540,848 A | 7/1996 | Engelhard | 210/748 |
| 5,581,189 A | 12/1996 | Brenn | 204/402 |
| 5,597,482 A | 1/1997 | Melyon | 210/209 |
| 5,647,416 A | 7/1997 | Desrosiers et al. | |
| 5,699,669 A | 12/1997 | Gebhard | |
| 5,795,459 A | 8/1998 | Sweeney | 205/701 |
| 5,900,212 A | 5/1999 | Maiden et al. | 422/24 |
| 5,928,490 A | 7/1999 | Sweeney | 205/700 |
| 5,958,229 A | 9/1999 | Filiopoulos et al. | 210/192 |
| 5,989,396 A | 11/1999 | Prasnikar et al. | 204/290 |
| 6,007,686 A | 12/1999 | Welch et al. | 204/217 |
| 6,017,447 A | 1/2000 | Wright et al. | |
| 6,110,424 A | 8/2000 | Maiden et al. | 422/24 |
| 6,197,189 B1 | 3/2001 | Schwartz et al. | |
| 6,203,696 B1 | 3/2001 | Pearson | 210/98 |

PORTABLE WATER DISINFECTION SYSTEM

CROSS-REFERENCE TO RELATED APPLICATIONS

This application is a continuation-in-part application of U.S. patent application Ser. No. 09/318,468, entitled "Portable Water Disinfection System", filed on May 25, 1999, now U.S. Pat. No. 6,261,464, issued Jul. 17, 2001 which is a CIP of U.S. patent application Ser. No. 09/318,469, entitled "Portable Water Filtration and Pump System", filed on May 25, 1999, and U.S. patent application is a CIP of Ser. No. 09/514,431, entitled "Portable Disinfection and Filtration System", filed on Feb. 28, 2000, and the specifications thereof are incorporated herein by reference.

GOVERNMENT RIGHTS

The U.S. Government has a paid-up license in this invention and the right in limited circumstances to require the patent owner to license others on reasonable terms as provided for in the terms of Contract No. DABT63-98-C-0052 awarded by U.S. Defense Advanced Research Projects Agency.

FIELD OF THE INVENTION

The present invention relates to water disinfecting systems, and more particularly, to an apparatus for generating disinfecting solutions to be added to potentially contaminated water to render that water potable.

BACKGROUND OF THE INVENTION

Maintaining the sterility of drinking water supplies is a major factor in reducing the health risks to human populations. While large metropolitan water systems can make use of highly toxic chlorine gas for sterilizing drinking water, such systems are impractical in remote locations, which lack highly trained personnel and the equipment to maintain the systems. There are many settings in which sophisticated systems are not practical. For example, campers or military personnel in the field cannot be expected to operate such a system to provide potable drinking water from streams or other potentially contaminated water sources. To be effective in such rural settings, a system must be capable of running for long periods of time with little or no maintenance. In addition, the raw materials required by the system must be readily available.

Systems based on the electrolytic production of chlorine and/or other chlor-oxygen species based germicidal agents are particularly attractive for use in the present invention. These systems require only electricity and common salt as raw materials. One such system is described in U.S. Pat. No. 4,761,208 to Gram, et al. entitled *Electrolytic Method and Cell for Sterilizing Water,* which is incorporated herein by reference. The system of the present invention utilizes an electrolytic cell to generate an oxidant solution including chlorine in the form of hypochlorous acid and other chlor-oxygen species. Other embodiments of the present invention produce an oxidant solution that is predominantly sodium hypochlorite. The oxidant solution is produced from a brine solution using common salt. This oxidant solution may be added directly to the drinking water at a dilution ratio compatible with the concentration of the oxidant produced in the device and the demand of the water. The oxidant produced is more effective at inactivation of microorganisms than is conventional chlorination technology, including chlorine gas, sodium hypochlorite, and calcium hypochlorite. At adequate dilution ratios, the water is sterilized without causing the water to become unpalatable. This technology is particularly attractive because of its simplicity and long maintenance free operation time. Studies have been conducted to demonstrate the microorganism inactivation effectiveness of the oxidant, commonly referred to as mixed-oxidant solution. Linda V. Venczel, Michael Arrowood, Margaret Hurd, and Mark D. Sobsey with the University of North Carolina at Chapel Hill, N.C. have conducted research and published a paper entitled, *Inactivation of Cryptosporidium parvum Oocysts and Clostridium perfringens Spores by a Mixed-Oxidant Disinfectant and by Free Chlorine,* published in *Applied and Environmental Microbiology,* April 1997, p. 1598–1601.

The systems based on mixed-oxidant production have been used successfully in rural communities with small water supplies to larger municipal water systems treating millions of gallons per day. These larger systems are not well suited for use by individual campers and personnel in the field who must treat small quantities of water on a daily basis. The mixed oxidant systems designed to date are applicable to large quantities of water and are large and heavy. In addition, these systems require quantities of electrical power that are not practical at the mesoscale, or individual person level.

SUMMARY OF THE INVENTION

The present invention comprises a portable oxidant generator comprising at least one cell wherein the cell comprises at least two electrodes wherein at least one electrode comprises at least one cathode and at least one anode. In a preferred embodiment, the oxidant generator comprises a circuit for providing an electrical potential between at least one of the at least one cathode and at least one of the at least one anode. In such an embodiment, the circuit comprises electricity that originates from an energy source, such as, but not limited to, energy sources comprising mechanical sources, chemical sources, magnetic sources, pressure sources and/or electromagnetic radiation sources. In a preferred embodiment, oxidant generation relies on an electrolyte solution that is placed in a cell wherein an applied electrical potential causes electrical charge to pass to the electrolyte solution thereby generating at least one oxidant in the electrolyte solution. According to the present invention, electrolyte and/or electrolyte solution resides in a cell that generates oxidant in a batch mode and/or electrolyte and/or electrolyte solution passes through a cell that generates oxidant in a continuous mode. In a preferred embodiment, an electrolyte solution resides in a cell that generates oxidant in a batch mode. In such a preferred embodiment, individual aliquots of batch mode generated oxidants are added to a liquid in an effort to disinfect the liquid. Of course, oxidants generated by the apparatus and method of the present invention are suitable for disinfecting, bleaching and/or degrading liquid as well as other material, such as, but not limited to, human and/or animal body parts and food and material contained in a liquid. Oxidants generally comprise chemically reactive species capable of oxidizing a substance by, for example, accepting electrons. Therefore, the oxidants generated by the apparatus of the present invention comprise many uses.

In a preferred embodiment, the portable generator comprises an annular cell comprising an inner annular surface and an outer annular surface. In a preferred embodiment, the annular cell comprises at least one electrode positioned on the inner annular surface and/or at least one electrode positioned on the outer annular surface. Such electrodes optionally comprise the surface and/or electrodes in contact with the surface, for example, pins and/or plates. In a preferred embodiment, the at least one of the at least two electrodes comprises at least one catalyst. For example, in embodiments comprising a catalyst, a catalyst optionally comprises at least one Group VIIIB element of the Periodic Table of Elements and/or compounds thereof and preferably, at least one catalyst comprises ruthenium oxide.

According to the present invention, an electrical charge is delivered to a solution and/or substance comprising, for example, electrolyte. In a preferred embodiment, the circuit delivers a controlled electrical charge to an electrolyte solution. In an alternative embodiment, the oxidant generating apparatus measures and/or signals a characteristic of oxidant generation that terminates electrical charge delivery and/or notifies a user to terminate electrical charge delivery. In a preferred embodiment, the portable oxidant generator comprises a circuit that measures the electrical charge passed to an electrolyte solution and/or other electrolytic substance, for example, but not limited to, a gel and/or a solid.

In a preferred embodiment, the portable generator further comprises an output device for outputting information. For example, an output device for outputting information optionally comprises at least one output such as tactile, auditory, olfactory and visual outputs. Alternatively, the output comprises an electromagnetic output comprising, for example, electromagnetic radiation. According to a preferred embodiment of the present invention, information comprises at least one type of information selected from the group consisting of electrical charge, energy level, remaining energy, electrolyte level, remaining electrolyte, integrity of said portable generator, temperature, total dissolved solids, conductivity, pH, ion concentration, residual oxidant, and oxidation-reduction potential. The generator of the present invention optionally comprises a circuit for measuring at least one condition selected from the group consisting of temperature, total dissolved solids, conductivity, pH, ion concentration, residual oxidant, and oxidation-reduction potential. Such information is optionally provided to the same and/or a different circuit for providing at least one electrical potential for oxidant generation and/or other use.

In a preferred embodiment, the cell of the inventive generator comprises a reservoir, for example, but not limited to, a reservoir for holding a batch for batch mode operation. The generator optionally comprises at least one reservoir, which optionally comprises the cell, an additional cell, and/or a reservoir other than a cell. In embodiments comprising at least one reservoir, the reservoir optionally comprises an electrolyte reservoir, for example, but not limited to, a salt reservoir, a refillable reservoir, a disposable reservoir, and/or a self-sealing reservoir wherein the self-sealing reservoir optionally comprises a seal selected from the group consisting of an elastomer and a mechanical check valve.

In some embodiments, depending on use, deposits form on, or within, the portable generator. In such embodiments, the portable generator optionally comprises at least one deposit removing apparatus optionally comprising a scraper and/or a shaft comprising break-away segments.

In a preferred embodiment, the portable generator comprising a clip for clipping the generator to an object and wherein the embodiment comprises a housing, the housing optionally comprises a clip for clipping the housing to an object.

According to a preferred embodiment of the present invention, the portable oxidant generator comprises a housing. In a preferred embodiment comprising a housing, the housing optionally comprises a tube comprising at least one cross-section selected from the group consisting of circular, ellipsoidal, and polygonal cross-sections. In tube embodiments, the tube preferably comprises a length between approximately 3 cm and approximately 60 cm and preferably comprises a width between approximately 0.5 cm and approximately 30 cm. In several preferred embodiments, described herein, embodiments comprising a tube are referred to generally as "pen" embodiments of the present invention. Alternatively, the housing comprises a different shape, such as, but not limited to, a "cap" or "lid" shape suitable for opening, closing and/or sealing a container; thereby the apparatus is optionally capable performing a cap or lid function in addition to oxidant generation. In a preferred embodiment, a cap-shaped oxidant generator optionally comprises at least one set of threads and/or at least one aperture for insertion of a drinking utensil, such as, but not limited to, a straw. Of course, other cap or lid functions are within the scope of the present invention including those that do not rely on threads for attaching to and/or opening, closing and/or sealing a container, for example, but not limited to, snap closure mechanisms. Alternatively, the oxidant generating apparatus resides within and/or on a surface of a container, such as, within a canteen and/or attached to a side of canteen (e.g., inner and/or outer surface).

The present invention also comprises an inventive method for treating a substance using an oxidant generator. In a preferred embodiment, the method comprises the following steps: creating oxidation/reduction products in a portable electrolytic cell for holding an electrolyte; and releasing the products onto or into a substance for treating the substance. In a preferred embodiment, the step of releasing the products onto a substance for treating comprises releasing oxidants to a liquid (fluid) and/or other substance. Accordingly, the step of releasing the products to a substance for treating optionally comprises releasing the oxidants to a substance for decontaminating the substance.

In general, generation of oxidants also results in the generation of reductants, or reducing agents. In some instances, reducing agents comprise gas, such as, but not limited to, hydrogen gas. According to a preferred embodiment, at least some of the reducing agents comprising gas are optionally vented from the oxidant generator. It is understood that the oxidant generator of the present invention preferably comprises a generator that generates both oxidants (e.g., oxidizing agents) and reductants (e.g., reducing agents).

According to a preferred embodiment of the inventive method, the step of creating oxidation/reduction products in a portable electrolytic cell for holding an electrolyte comprises creating oxidation/reduction products by passing water through a porous electrolyte chamber to be collected in the cell. In a preferred embodiment, the step of creating oxidation/reduction products in a portable electrolytic cell for holding an electrolyte comprises creating oxidation/reduction products by passing an electrical charge to an electrolyte, preferably, the electrical charge passes to the electrolyte through an anode and/or cathode. In a preferred embodiment, the step of creating oxidation/reduction products in a portable electrolytic cell for holding an electrolyte comprises creating oxidation/reduction products by measuring the total dissolved solids of the substance. In a preferred embodiment, the step of creating oxidation/reduction products in a portable electrolytic cell for holding an electrolyte comprises creating oxidation/reduction products by pressing/pushing the end of the electrolytic cell comprising a self-sealing electrolyte storage compartment when electrolytic cell is inserted into the substance. In a preferred embodiment, the step of creating oxidation/reduction products in a portable electrolytic cell for holding an electrolyte comprises creating oxidation/reduction products by generating an electric current in an apparatus comprising a configuration selected from the group consisting of tube configurations and cap configurations.

In a preferred embodiment, the step of creating oxidation/reduction products in a portable electrolytic cell for holding an electrolyte optionally comprises creating oxidants by: generating an electrical charge in an electrolytic cell comprising at least two electrodes; and/or generating an electrical charge from an anode comprising at least one catalyst wherein the anode and/or cathode optionally comprise titanium and/or optionally comprise a metal oxide coating, such as, but not limited to, ruthenium oxide.

In a preferred embodiment, the step of creating oxidation/reduction products in a portable electrolytic cell for holding an electrolyte comprises creating oxidation/reduction products by generating an electrical charge from an anode comprising at least one metal selected from the group consisting of the Group VIIIB elements in the Periodic Table of the Elements and compounds thereof. According to a preferred embodiment, the step of creating oxidation/reduction products in a portable electrolytic cell for holding an electrolyte comprises creating oxidation/reduction products in a reservoir.

Preferred embodiments of the present invention comprise an apparatus to treat a substance, the apparatus comprising a portable electrolytic cell for generating oxidation/reduction products, the products to be subsequently added to the substance. The apparatus preferably comprises a hand-holdable configuration. Preferably, the electrolytic cell comprises a plurality of plates, more preferably an anode and a cathode. Preferably the anode comprises a catalytic material, more preferably a titanium substrate preferably with an oxide coating, more preferably at least one metal selected from the group VIII elements of the Periodic Table of the Elements, and most preferably wherein the oxide coating comprises ruthenium, for example, ruthenium oxide.

In a preferred embodiment of the present invention, the cathode is disposed within the anode, alternatively where the anode is disposed adjacent to the cathode and preferably comprises an outer housing for the anode, preferably wherein at least one of the anode or cathode comprises a metallic, plastic, ceramic, silicone, or a non-conducting material. A preferred embodiment also preferably comprises a pocket clip for attachment to the user's pocket. The electrolytic cell preferably comprises a delivery mechanism for adding oxidation/reduction products to the substance, and preferably comprises a power source comprising an electrical, electromechanical, or chemical generator. The power source preferably additionally comprises a generator to convert mechanical energy to electrical energy.

In a preferred embodiment of the present invention the apparatus comprises a reservoir, preferably a salt reservoir, and more preferably a refillable or disposable reservoir. Preferably, the chamber comprises a reservoir. A preferred embodiment further comprises an electrolyte storage compartment comprising a self-sealing cap. The cap comprises an elastomer or a mechanical check valve.

A preferred embodiment of the present invention further comprises a deposit-removing apparatus, preferably a scraper and/or a shaft comprising breakaway segments. The apparatus also preferably comprises a circuit for measuring total dissolved solids (TDS) in the substance to be treated, preferably an electrical circuit included in an integral circuit, and preferably further comprises a visually readable, audible, or tactile indicator for completion of electric charge in the substance, most preferably a vibratory indicator. The apparatus preferably additionally comprises a temperature measuring device.

Additionally, in a preferred embodiment, the present invention comprises a method for measuring chlorine, for example, residual chlorine in treated water, comprising an oxidation reduction potential (ORP) apparatus. In a preferred embodiment, the present invention comprises a pH measurement apparatus that optionally provides a signal for use in adjusting the ORP apparatus for variations in pH, for example, variations in treated water pH.

The present invention is also a method for treating a substance using an oxidant generator comprising the steps of creating oxidation/reduction products in a portable electrolytic cell for holding an electrolyte, and releasing the products onto a substance for treating. Preferably, the oxidants are released onto a fluid, and more preferably the oxidants are released for decontaminating. The oxidants are preferably created by passing water through a porous salt chamber to be collected in the cell, preferably by passing an electric current through an electrolyte, and more preferably by generating an electric current from an anode to a cathode, and alternatively in an electrolytic cell comprising a plurality of plates. Preferably the anode comprises a catalytic material, preferably a titanium substrate. The anode preferably further comprises an oxide coating, and preferably comprises at least one metal selected from the Group VIII materials in the Periodic Table of the Elements, and more preferably comprises ruthenium oxide. In a preferred embodiment of the present invention, the oxidation/reduction products are created in a reservoir.

Broadly, it is the object of the present invention to provide an improved oxidant generator.

It is a further object of the present invention to provide an oxidant generator that may be carried conveniently by a single person and utilized to sterilize small quantities of drinking water.

A primary advantage of the present invention is the small size and light weight of the apparatus.

Another advantage of the present invention is the ability to measure total dissolved solids in the sample with the same apparatus to treat the water.

Yet another advantage of the present invention is the ability to measure the oxidation reduction potential (ORP) of a substance, for example, but not limited to, treated water.

Yet another advantage of the present invention is the ability to treat a larger volume of water using a portable apparatus.

A further advantage of the present invention is the use of a safe-to-produce solution to disinfect a water supply.

A yet further advantage of the present invention is the ability to provide a hand-holdable and/or portable treatment apparatus comprising, for example, a pen-like and/or container cap configuration.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DETAILED DESCRIPTION OF THE INVENTION

In the claims and specification of the present invention, the term decontaminate is used herein to describe a process whereby pathogenic micro-organisms are inactivated to render a source of water potable. Likewise, decontaminate also applies to a chemical process whereby the oxidant product of the disinfection apparatus can react chemically with other toxic chemicals so that the resulting reaction products are not harmful for human contact or consumption. Portability refers to a device that can physically be moved by one or more humans. In a preferred embodiment, the present invention comprises a portable, batch mode, oxidant generator that generates an aliquot of oxidant solution that can be added to water in a canteen or other storage container to provide drinking water. Alternative embodiments wherein oxidants are generated in a "continuous" manner are also within the scope of the present invention. In a preferred embodiment, the invention requires a source of salt, such as, but not limited to, sodium chloride. In preferred embodiments of the invention, shown generally in FIGS. 1A and 1B, a quantity of salt sufficient for several days of field use is optionally included. In another embodiment of the present invention, a salt solution pre-made to the correct concentration is stored in a capsule in the cap and is accessed by the apparatus through a re-sealable opening in the end of the capsule. Other embodiments that utilize conventional salt carried by back packers and military personnel may also be utilized as explained below.

Figure 3:
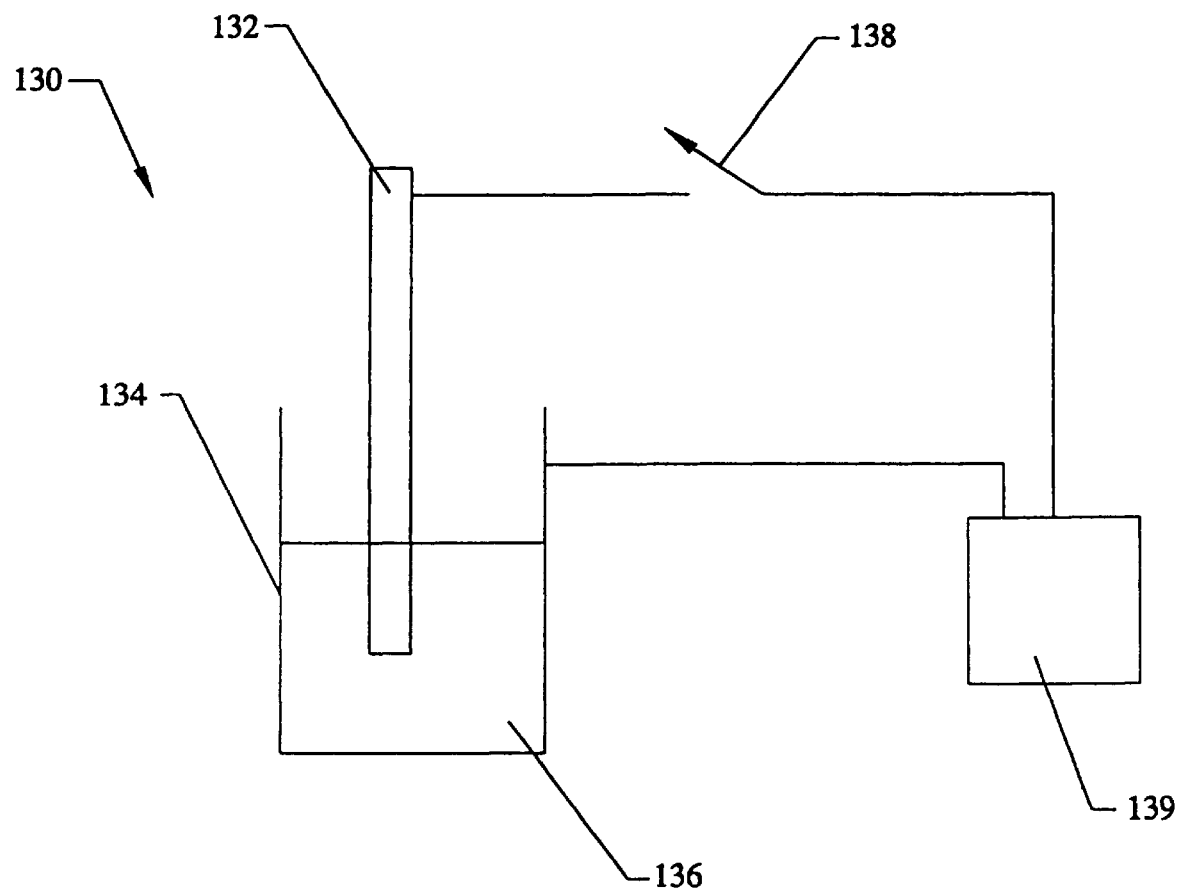
FIG. 3 is a schematic view of an oxidant generator according to the present invention.

The present invention is based on the electrical chemical reactions that take place when a current is passed through a salt solution between at least one anode and at least one cathode in contact with the solution. According to the present invention, electrodes need not be necessarily "in" the solution but rather in electrical contact with the solution. The manner in which the present invention operates may be more easily understood with reference to FIG. 3, which is a schematic view of an oxidant generator 130. Salt solution 136 is subjected to electrolytic decomposition by passing a current from a power or energy source 139 between an anode 134 and a cathode 132. The chemical species generated, in general, depends on the material from which the anode 134 is constructed, as well as the electrical potential across the anode 134 and the cathode 132, and fluid conditions in the cell. The preferred anode materials comprise a titanium substrate with an oxide coating of Group VIII metals such as platinum, iridium, rhodium, or ruthenium, although other typical anode materials may be utilized in accordance with the present invention. In a preferred embodiment of the present invention, at least one anode comprises ruthenium, for example, ruthenium oxide. These particular Group VIII metals, in addition to being highly reactive catalytic compounds that produce products with good germicidal properties, resist corrosion to a high degree and do not dissolve easily. Coatings can be applied in a number of fashions including painting or spraying followed by oven baking. Coatings can also be applied by deposition and other methods known to those versed in the art and commonly applied in, for example, semiconductor and other industries.

The quantity of oxidant (or oxidants) generated depends primarily on the quantity of current (charge per unit time) that passes through the salt solution for a wide range of salt solution concentrations. The present invention optionally comprises observation of current to simplify the control of the quantity of oxidant generated. For the purposes of the explanation of the present invention, it is sufficient to observe that a switch 138 is closed for a period of time that is sufficient produce an electrical potential between the anode 134 and the cathode 132 and to allow a predetermined and/or a monitored amount of charge to flow to the solution 136 in contact with the anode 134 and the cathode 132. After this amount of charge has passed from one electrode to another the electrodes, the salt solution 136 contains a predetermined and/or determinable amount of oxidant or oxidants. This solution is then optionally added directly to a predetermined amount of drinking water, such as the water in a canteen, which provides a prescribed oxidant dose to the water. Alternatively, the volume or weight of the drinking water to be treated is not known. In this alternative situation, a preferred embodiment comprises measurement capabilities that allow for measurement of characteristics that infer potability, such as, but not limited to, measurements that determine whether residual oxidant is present.

According to a preferred embodiment, the oxidant solution generated by the present invention is highly concentrated. For example, concentrations optionally allow for a dilution ratio of approximately 4000:1 of water to be treated to oxidant solution. In such embodiments, only about 0.5 milliliter (ml) of salt needs to be processed to provide disinfectant for, e.g. a liter of drinking water. The salt solution 136 having a salt concentration of from fractions of a percent to fully saturated is sufficient for the purpose of the present invention. Of course, the solution optionally comprises more than one type of salt and/or other soluble material. According to a preferred embodiment, a few grams of salt are sufficient to provide an individual with potable water for several weeks. Since individuals such as hikers or military personnel typically carry salt, the present invention only requires that the individual carry extra salt, some or all of which may be integral to the salt compartment.

Since the amount of oxidant provided does not depend heavily on the salt concentration in the salt solution or brine, the present invention does not require a highly accurate measurement system for generating the salt solution 136. This reduces the complexity of the apparatus, which, in turn, reduces its costs and increases system reliability and functionality.

Furthermore, the current that passes through the salt solution 136 can vary significantly, provided that a minimum amount of charge passes through the salt solution 136. Excess charge leads to excess oxidant or oxidants being generated, which the user can typically tolerate. Excess oxidant does not adversely affect the taste of the final drinking water. However, according to a preferred embodiment, the present invention limits excess oxidant.

Figure 1A:
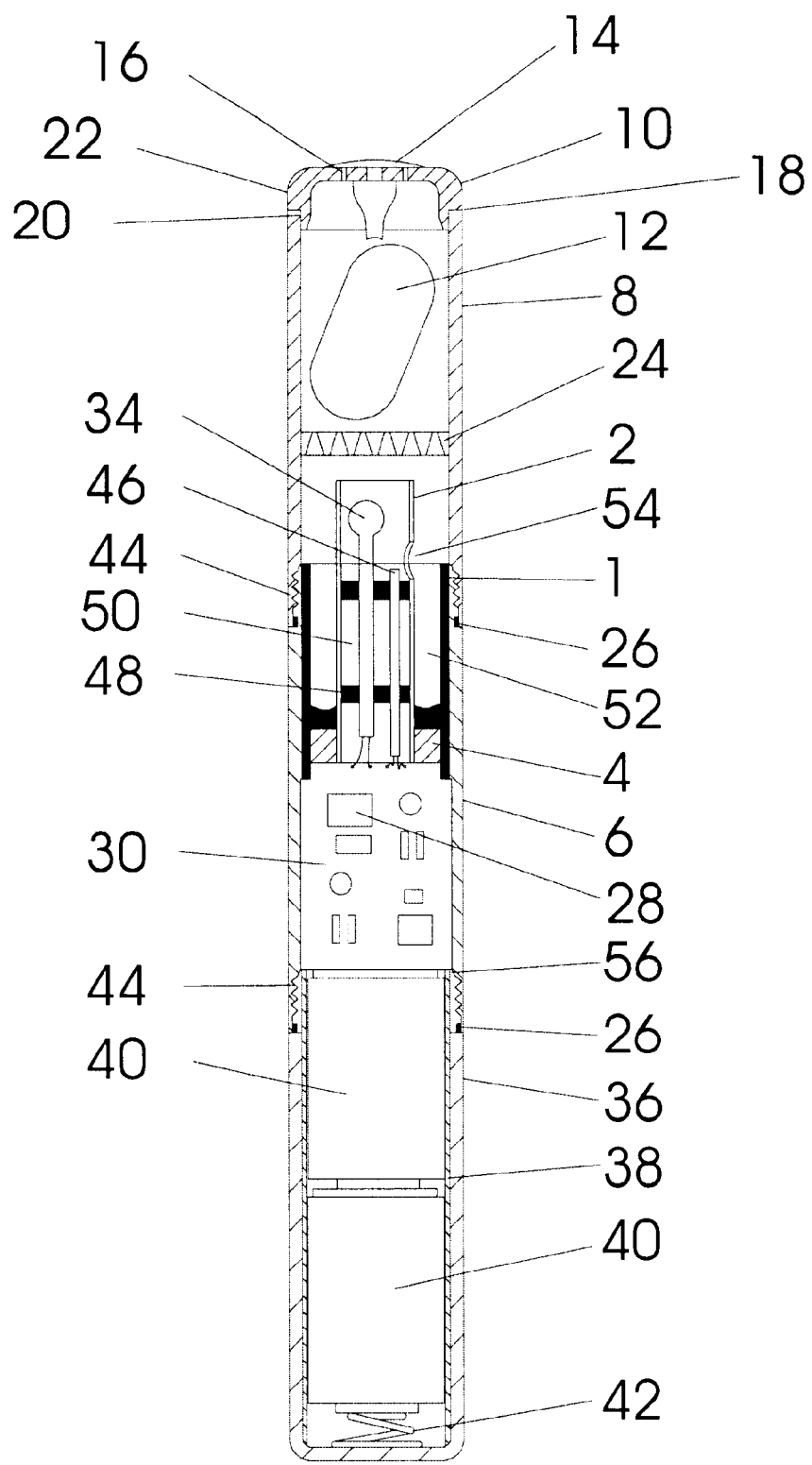
FIG. 1A is a cut-away view of a preferred embodiment of an oxidant generator according to the present invention.

In a preferred embodiment, referred to in FIG. 1A, the present invention comprises the following five elements: an electrolytic cell located in a housing 6, a brine (salt solution) generation compartment located within the housing 8, a power compartment located within the housing 6, a control circuit 30, and a fluid quality sensor package housed within a cathode 2. In this preferred embodiment, the electrolytic cell comprises an anode 1 concentrically surrounding the cathode 2. In this embodiment, the anode 1 comprises an outer annulus of an annular cell and the cathode 2 comprises an inner annulus of the annular cell. Of course, plate and/or other shaped electrodes are within the scope of the present invention as are cells comprising other shapes. The anode 1 and the cathode 2 are held concentrically in position by a spacer 4, which creates a liquid tight seal between the two elements. In this preferred embodiment, the anode 1 comprises a tube, optionally comprising titanium, sealed within the plastic cell housing 6. Further, the anode 1 is coated on the internal surface with at least one Group VIII catalyst in the form of, for example, a metal oxide. Preferably, the Group VIII catalyst metal oxide comprises ruthenium oxide. The annular space between the anode 1 and the cathode 2 comprises a cell chamber 52. Disinfectant solution, comprising at least one oxidant, is generated within the cell chamber 52 when brine (salt solution) is introduced into the cell chamber 52 and an electrical potential is applied between the anode 1 and the cathode 2 thereby allowing charge to flow to the salt solution in the cell chamber 52. The concentration of disinfectant solution, comprising at least one oxidant, generated within the cell chamber 52 is explicitly defined by the amount of electrical charge that flows to the brine (salt solution).

According to the embodiment shown in FIG. 1A, brine (salt solution) for electrolysis in the electrolytic cell 52 is produced in the brine housing 8. In the preferred embodiment shown in FIG. 1A, the brine housing 8 comprises a single piece injection molded plastic housing comprising at least one integral cap 10 attached to the housing 8 by at least one integral hinge 18, at least one integral salt filter 24, and at least one gas (e.g., hydrogen) vent valve 14. Operationally, the brine housing 8 is removed from the cell housing 6 by separating at threads 44. Water is introduced in to the cell chamber 52 and then the brine housing 8 is reconnected to the cell housing 6. Of course, if the water comprises a sufficient level of electrolyte, such as, salt, then addition of additional electrolyte (e.g., salt) is in some instances optional. In this preferred embodiment, the brine housing 8 is threaded to match the cell housing 6 via threads 44 and a water tight seal is created by a seal 26. The complete disinfection pen assembly identified by FIG. 1A is, for example, shaken by the operator to introduce water from the cell chamber 52 through the salt filter 24 in to the brine chamber 8. According to this preferred embodiment, the water comes in contact with salt to dissolve salt to form brine (salt solution). In this preferred embodiment, salt is in the form of a salt tablet 12, but may also consist of salt in granular and/or crystal form, of course, the salt optionally comprises pure salt or salt comprising impurities, including, but not limited to, other salts. Undissolved salt is precluded from entering the cell chamber 52 by the salt filter 24. In this preferred embodiment, the salt filter 24 is, for example, injection molded integrally with the brine housing 8. Alternatively, for example, but not limited to, the filter screen is ultrasonically welded into the brine housing 8. In this preferred embodiment shown in FIG. 1A, the brine housing 8 is sealed by the integral cap 10. The cap 10 provides an access port whereby the salt tablet 12 is introducable into the brine housing 8. In this embodiment, the cap 10 is integrally connected to the brine housing 8 via the hinge 18. In this preferred embodiment, the hinge 18 is categorized and known in the industry as a "living hinge" and it is integrally molded with the brine housing 8 and the cap 10. Of course, the present invention optionally comprises other types of hinges and/or access ports and/or ways to introduce salt and/or other electrolyte for generating oxidants. In this preferred embodiment, the cap 10 forms a watertight seal 20 with the brine housing 8. At least one notch 22 provides a sharp edge for lifting and opening the cap 10 from the brine housing 8. A check valve 14 is preferably an elastomer "umbrella-type" check valve and it snaps in to place via a small central hole in the cap 10. During the electrolysis process that occurs in the cell chamber 52, hydrogen gas is, for example, liberated due to chemical reactions. Liberated hydrogen gas is, for example, vented up through the salt filter 24 and out through the at least one vent hole 16 located underneath the check valve 14 and then to the atmosphere outside of the disinfection pen assembly.

In this preferred embodiment, electrical energy to power the electrolysis reaction in the cell chamber 52 is provided by at least one battery 40. In alternative embodiments, power is provided by a fuel cell, other electrochemical reaction devices, electromechanical devices such as an inductive circuit, or other electrical energy producing devices, including, but not limited to, solar, heat-solar, etc. In this preferred embodiment, the at least one battery 40 is housed in the plastic housing 36. Of course, according to the present invention, the housing optionally comprises a material other than plastic. Electrical energy from the at least one battery 40 is transmitted to an electrical circuit 30 preferably via an electrically conductive metallic strip 38, optionally positioned in a slot molded in housing 36 wherein the slot optionally comprises a tapered slot. and/or a slot with tapered and/or angled walls.

In an alternative embodiment, electricity from the at least one battery 40 is transmitted to the electrical circuit 30 via a thermal sprayed copper coating on the inside of the plastic housing 36. In another alternative embodiment, electricity is transmitted between the at least one battery 40 and the electrical circuit 30 via a polymer-based grafted coating on the inside of the housing 36. In this particular preferred embodiment, energy is transmitted from the at least one battery 40 to the electrically conductive strip 38, or optionally a copper tube, via a compression spring 42. In an alternative embodiment, the electrically conductive strip 38 comprises a spring type characteristic that also compresses a spring tab at the base of the housing 36 in lieu of the compression spring 42. Essentially, in this embodiment, the base of the strip serves as a spring. The housing 36 is sealed with the cell housing 6 via a seal 26'. In this preferred embodiment, the housing 36 is attached to the cell housing 6 via threads 44'.

In this preferred embodiment, power and other functions are controlled via the circuit 30. The circuit 30 serves to control the flow of electrical charge to the cell chamber 52 as well as optionally controlling the operation of an oxidation reduction potential (ORP) sensor 34, a total dissolved solids (TDS) sensor 46, and other sensors, for example, but not limited to, sensors that help maintain the accuracy of the ORP sensor 34 and/or the TDS sensor 46. The primary function of the circuit 30 is to control energy input in to the cell chamber 52. Operationally, the initial concentration of brine in the cell chamber 52 can be variable. Brine concentration variability is, for example, a function of how vigorously the operator shakes the pen to generate the brine (salt solution), how much salt is located within the brine chamber 8, how much water ultimately gets in to the brine chamber 8, how much brine is in the water initially and how much brine returns to the cell chamber 52. Since many variables impact the concentration of the brine in the cell chamber 52 prior to application of electrical energy, it is useful for the electrical circuit 30 to measure and control the amount of electrical power that enters the cell chamber 52. The total mass of disinfecting oxidants produced in the cell chamber 52 during any given cycle is approximately in direct proportion to the amount of electrical charge that enters the brine. In order to provide consistent dosing from one application to the next, it is useful to consistently produce the same mass of disinfecting oxidants from one use to the next. In this preferred embodiment, the circuit 30 controls the mass of oxidants produced in one use and operates a tactile device (vibrator) and/or other notification means, such as visual, taste, heat, pressure and/or auditory, to indicate to the operator that the oxidant production process is complete. For example, oxidant generation may involve production of a gas, which may be related to oxidant generation, which in turn may trigger a pressure sensor thereby alerting the user that enough oxidant has been generated. In a preferred embodiment, the notification means is a vibratory signal produced by energizing a small electric motor with an eccentric cam attached to the motor shaft. This mechanism optionally provides for an auditory signal (e.g., whistle) or other types of signals generally known in the field of cellular phones. A cellular phone or other portable communication device comprising the disinfection apparatus of the present invention is within the scope of the present invention. In such an alternative embodiment, energy sources, circuitry and/or signaling means are optionally shared by the communication device and the disinfection apparatus.

In the process of producing brine within the housing 8, several conditions may occur that result in production of brine of insufficient concentration. Such situations may occur, for example, when there is no salt within the housing 8, during initial operation when a dry salt tablet absorbs all of the water that enters the housing 8, or when the operator does not sufficiently shake the disinfection pen to produce brine. In this preferred embodiment, the control circuit 30 notifies the operator that insufficient brine exists in the cell housing 52. In this preferred embodiment, the electrical circuit 30 measures the charge and/or current input to the cell chamber 52. If insufficient brine exists in the cell chamber 52, insufficient charge will flow to the cell chamber 52. In this preferred embodiment, insufficient brine concentration will result, for example, in immediate activation of the tactile (vibratory) circuit to advise the operator that insufficient brine exists in the cell chamber 52.

An insufficient source of electrical energy will result in poor, or no, production of disinfecting oxidant. In this preferred embodiment of the present invention, the control circuit 30 will measure the amount of electrical energy (and/or power) available from the energy source and will result in immediate activation of the tactile (vibratory) circuit to advise the operator that insufficient energy exists to operate to produce a minimum amount of disinfectant oxidant. As discussed herein, it is understood that most batteries are rated in volts, which is related to electrical potential energy. Power is often given in Watts as, for example, the product of current squared and voltage where current is the amount of electrical charge transferred per unit of time. According to the present invention, electrolysis depends on transfer of electrical charge; thus, any energy source capable of directly or indirectly providing for transfer of electrical charge is within the scope of the present invention.

In the preferred embodiment shown in FIG. 1A, the pen is activated by closing an electrical switch. The switch contacts comprise the electrically conductive metallic strip 38 and the anode 1. By rotating the circuit housing 6 relative to the plastic housing 36, the conductive strip 38 contacts the anode 1 at a gap 56 by virtue of the threads 44'. The seal 26' provides friction relative to the circuit housing 6 and the plastic housing 36, and prevents the pen from unscrewing and coming apart at the threads 44'.

Under some operational conditions, the operator may inadvertently leave the pen in the "on" position by failing to open the switch circuit. In this situation, the conductive strip 38 maintains contact with the anode 1 at the gap 56. Without a protection circuit, the at least one battery may stay energized and be damaged, and/or de-energize the at least one battery, and/or damage the pen. In this preferred embodiment, the circuit 30 will open the electrical circuit to the cell chamber 52 when oxidant preparation is complete.

Figure 1B:
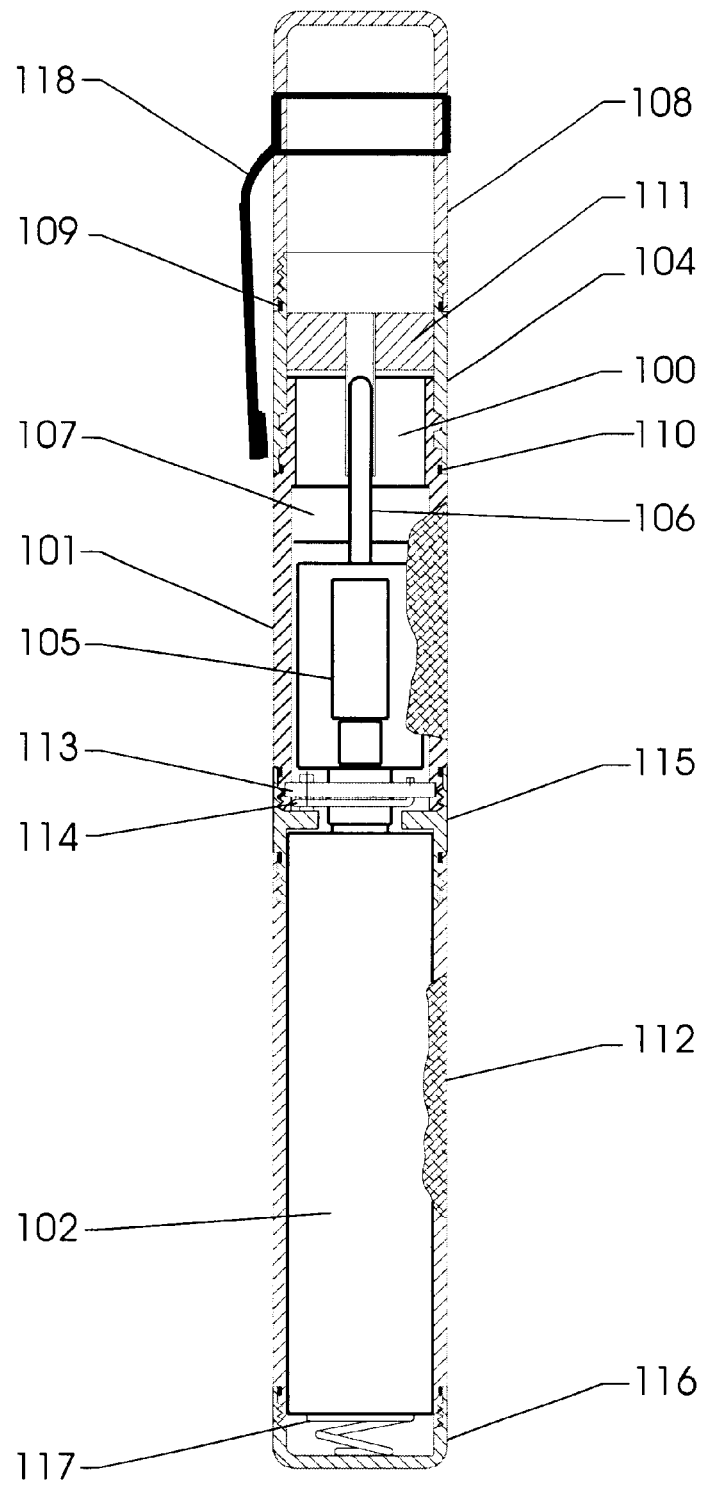
FIG. 1B is a cut-away view of a preferred embodiment of an oxidant generator according to the present invention.
Figure 1C:
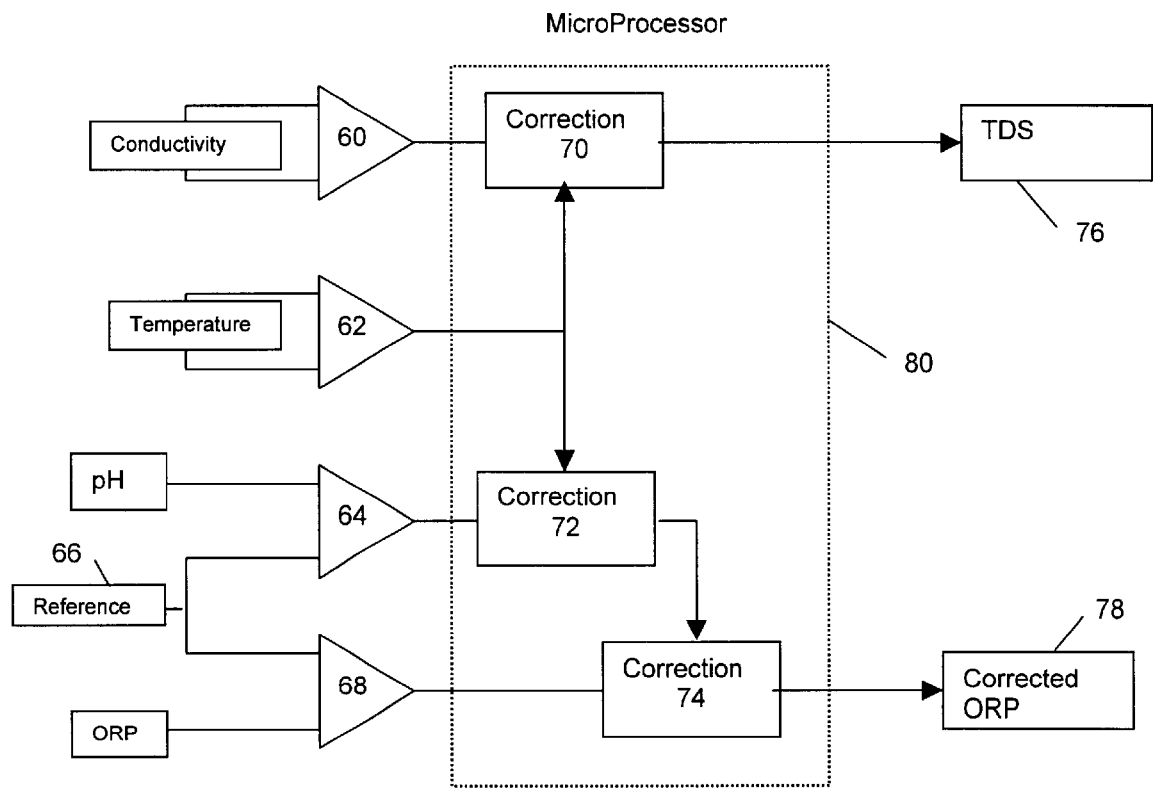
FIG. 1C is a schematic drawing of a sensor circuit according to a preferred embodiment of the present invention.

Referring to FIG. 1C, a sensor package is shown. The sensor package is, for example, located centrally within the cathode housing 2 of the embodiment shown in FIG. 1A. In a preferred embodiment, the sensor package comprises sensors for performing functions. For example, referring to FIG. 1C, four sensors are shown:

1) A pH sensor 64 comprising a cell, preferably a pH glass bulb 34 (as shown in FIG. 1A) or alternatively an Ion Selective Field Effect Transistor (ISFET), further comprising, for example, a reference cell.

2) A temperature sensor 62, preferably comprising a Resistance Temperature Detector, or alternatively a thermistor or thermocouple optionally comprising a thermal well.

3) An Oxidation Reduction Potential (ORP) probe 68 (shown as element 46 in FIG. 1A) preferably comprising a noble metal optionally comprising a reference cell. According to the present invention, the ORP probe 68 preferably comprises a platinum probe.

4) A metallic sensor housing 2 enclosing the aforementioned sensors. The sensor housing 2, optionally comprises an electrode, and preferably comprises a cathode.

The 2 housing will afford physical protection of the sensors. The sensor housing 2 optionally comprises at least one aperture, slot and/or side port hole (element 54 in FIG. 1A), or the like, for preventing an air lock when the housing is immersed in a liquid medium. In a preferred embodiment the sensor housing 2 comprises titanium.

The metallic housing optionally functions as one of the electrodes of the electrolytic oxidant generating cell. In a preferred embodiment, a common reference cell 66 is used for both the pH and ORP sensors and is physically located within the confines of the sensor housing 2, optionally an electrode and preferably a cathode. In a preferred embodiment, the reference cell comprises a silver/silver chloride (Ag/AgCl) in, for example, an acrylamide gel. Antifreeze is optionally present to provide for low temperature operation. In a preferred embodiment, the sensors implement the following functions: pH, Temperature; ORP and/or Conductivity. The Conductivity sensor 60 performs a function that optionally employs the ORP probe and the sensor housing 2 as two electrodes and provides a measurement of Total Dissolved Solids (TDS).

In a preferred embodiment, various measurements are implemented as follows:

1) TDS is provided as an output 76 of the sensor package. In this embodiment, the TDS in solution is related to the conductivity of the solution and the temperature of the solution 70. This measurement is performed, for example, by impressing an alternating voltage potential across the ORP sensor 68 and the sensor housing 2 (e.g., electrode). The resulting alternating current is a function of the conductivity of the solution. This value is corrected for temperature. An alternating potential is used so as not to polarize the electrodes.

2) The pH of a solution is a measure of the hydrogen ion concentration. The pH measurement is performed by measuring the H+ions passing through a semipermeable H$^+$ barrier with respect to a reference cell, and optionally using the temperature of the solution to compensate this measurement.

3) ORP is provided as an output 78 of the sensor package. The ORP is a measure of the oxidizing ability of a solution (and/or presence of oxidant) and is dependent upon the pH and consequently the temperature of the solution. This measurement is made with respect to a reference cell for which a known ORP exists 74.

Oxidation reduction potential (ORP) is a good indicator of, for example, chlorine residual in water. The oxidant produced in the disinfection pen produces, among other things, a chlorine residual. The ability to verify chlorine residual is important to verify that the treated water is safe to drink. In the aforementioned preferred embodiment of the present invention, the ORP sensor 46 is housed within the cathode 2. Because ORP is exponentially variable with pH, a pH sensor 34 is housed within the cathode 2. Operation of pH sensors are well known to those versed in the technology. Electrolyte gel for operation of the a gel dependent sensor is located inside the cathode 2 and is confined between seals 48 at the upper and lower ends of the sensors within the cathode 2. Likewise, temperature is a linear variable with respect to ORP. To compensate, a temperature sensor is incorporated within the cathode 2. Conditioning and control electrical circuitry for all sensors is within, for example, the circuit 30.

Total dissolved solids (TDS) is acceptable in drinking water up to a maximum level of approximately 1000 milligrams per liter (mg/L). However, the generally accepted limit is 500 mg/L. Determination of TDS in water considered for drinking is important in order to determine if the TDS needs to be removed by reverse osmosis processes. In the aforementioned preferred embodiment of FIG. 1A, a TDS, or conductivity sensor is incorporated within the cathode 2. To preclude air from being trapped in the upper end of the sensor array within the cathode 2, at least one vent hole 54 (or slot, etc.) is present in a wall of the cathode 2.

In the aforementioned preferred embodiment of the present invention, the disinfection pen is controlled by the circuit 30 that optionally comprises an application specific integrated circuit (ASIC) 28 as well as other circuit components necessary to operate all control functions as well as the function of all sensors. In an alternative embodiment of the present invention, the control circuit comprises a printed circuit board (PCB) comprising electrical components. In another embodiment of the present invention, the control circuit comprises a PCB with industry standard micro-circuit as well as other discrete electrical components. In yet another embodiment of the present invention where the disinfection pen does not incorporate sensors or other the control features, the circuit comprises a simple switch that is activated by the operator for a specified period of time.

An alternative preferred embodiment is shown in FIG. 1B. This preferred embodiment of the present invention, comprises four primary components: electrolytic cell 100, power source 102, brine well 104, and integral circuit 105 for system control and measuring the total dissolved solids (TDS) in the source water to be treated. Alternatively, the system control circuit can be used for measuring the TDS of the brine, for example, if there is an insufficient amount of brine in the cell. An ORP sensor is optionally provided as well. In this preferred embodiment, cell 100 comprises outer housing 101 comprising cylindrical conducting wall that forms the anode of electrolytic cell 100. Cathode 106 is suspended inside outer housing 101 by spacer 107. In an alternative embodiment of the present invention, the cathode may be outer housing 101, and the anode may be central shaft 106. In a preferred embodiment of the present invention, the cell housing comprises a plastic, ceramic, silicone, or some other non-conducting material, and anode (as the outer electrode) comprises a titanium substrate (physically or chemically attached to the cell housing) with a Group VIII catalyst coating on the titanium substrate with conducting leads to the power source. Alternatively, the housing optionally comprises a metal comprising an integral or separate insulating material for insulating selective portions of the housing from internal operations. An aliquot of brine is held in electrolytic cell 100 during the time the current passes between the anode and cathode. The term "pen" is used throughout the specification and claims interchangeably to describe a handheld device as shown in the drawings. The manner in which the aliquot of brine is generated and held in place is discussed in more detail below. After the current has passed through the brine, the aliquot of treated brine, now partially or completely converted to oxidant, is expelled from electrolytic cell 100 in to the fluid to be treated. Unconverted brine solution that is introduced into the drinking water source is at a very dilute ratio and typically will not be tasted due to the low concentration.

Figure 2:
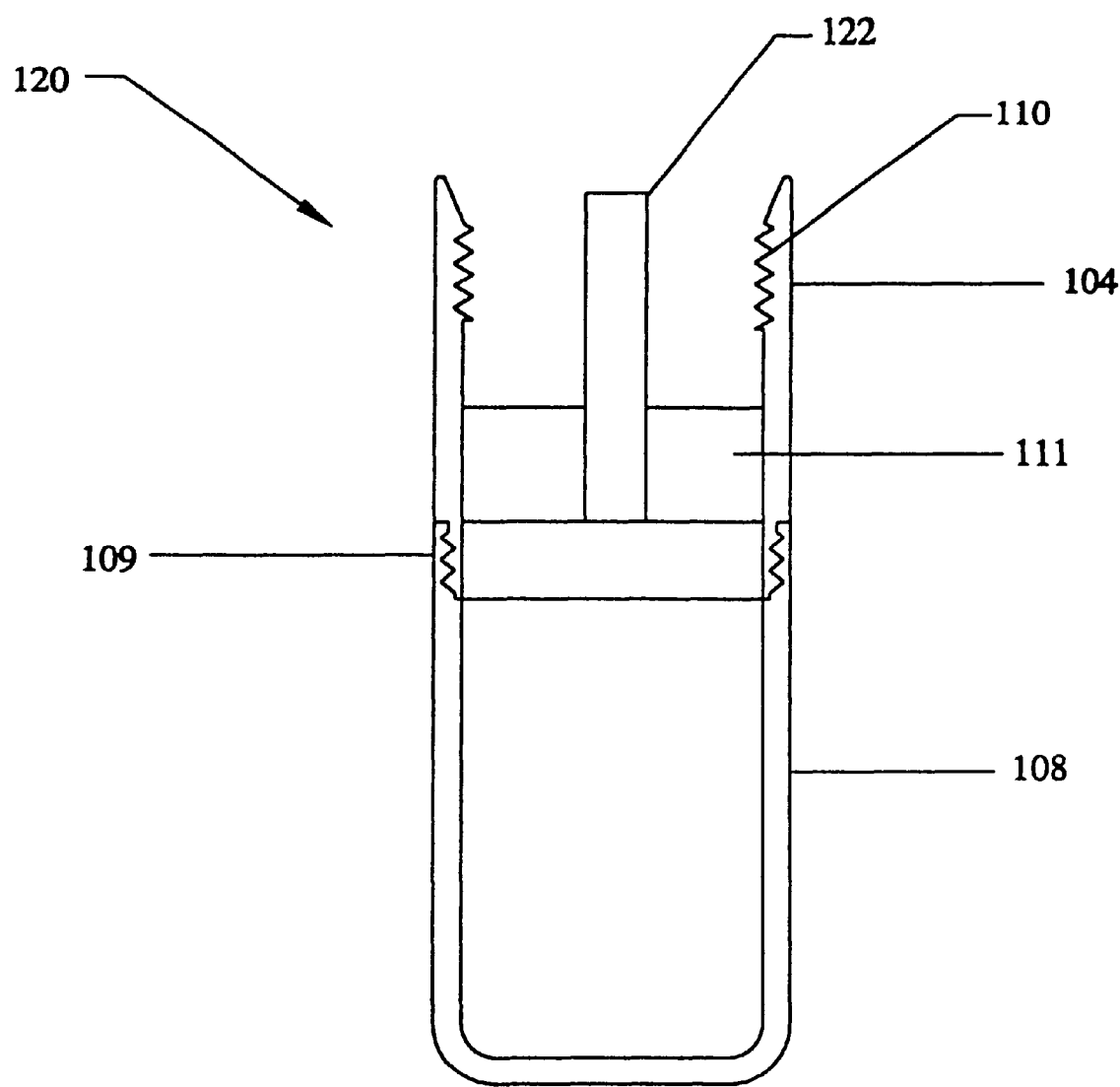
FIG. 2 is a cross-sectional view of a preferred embodiment of the present invention that incorporates a salt storage cap, salt strainer, brine mixing well, and cathode scraper.

In a preferred embodiment of the present invention, spacer 107 is also preferably a seal. Most preferably, cathode 106 is supported by spacer 107, which is sealed to outer housing 101. Further describing a preferred embodiment, brine generator assembly 120 of FIG. 2 comprises brine well 104 together with salt storage container 108 which are sealed together at joint 109 and are removed from "pen" via threaded joint 110. With brine generator assembly 120 removed, water is poured in electrolytic cell 100 (FIG. 1B). Referring again to FIG. 2, brine generator assembly 120 is re-installed on "pen" assembly. "Pen" assembly is shaken to allow water in electrolytic cell 100 to migrate through salt filter 111 so that water mixes with salt in salt storage container 108, thereby dissolving salt and making a salt brine solution. Holding "pen" upright, brine solution settles in electrolytic cell 100. "Pen" assembly is then ready for activation to produce oxidants via electrolysis. Activation occurs via electrical switch contact with integral circuit 105. In a preferred embodiment, switch activation occurs when power housing 112 is rotated relative to outer housing 101. Alternate switch embodiments include other switch configurations known to those versed in electrical switches. Spring retention plate 113 is captivated via locking tabs with anode 101. Torsion spring 114 returns outer housing 101 to resting position relative to power housing 112. With switch closure, in a preferred embodiment, integral circuit 105 releases a prescribed amount of electrical energy from power source 102 to brine solution in electrolytic cell 100. When the prescribed amount of electrical power is applied to brine in electrolytic cell 100, integral circuit 105 preferably actives electrical device for creating an audible, visual, or tactile feedback to notify operator that electrolysis is complete. Alternate embodiments include manual or mechanical means to meter electrical energy to cell 100. Brine generator assembly 120 of FIG. 2 is removed from "pen" and contents of electrolytic cell 100 (FIG. 1B) are poured into container of fluid to be treated, such as a canteen, to provide disinfection. Referring again to FIG. 2, brine well 104 incorporates hollow cathode scraper 122 which serves to scrape contaminants off of cathode element (e.g. cathode 106 in FIG. 1B) when brine generator assembly 120 is installed on tip of "pen".

In a preferred embodiment, power source 102 comprises an inductive coil device for generating electricity for storage in an energy storage device. In an alternative embodiment of the present invention, power source 102 comprises batteries. Power source 102 is retained in power housing 112 via compression spring 117 and end cap 116. To retain "pen" assembly in users pocket or other storage container, pocket clip 118 is attached to "pen" assembly.

Water sources with high levels of total dissolved solids (TDS), e.g. sea water, can be detrimental to human health due to the ion imbalance set up in the human system. As discussed in reference to FIG. 1C, TDS can be measured by knowing the specific conductance of the solution. Because the disinfection "pen" apparatus of the present invention has at least one anode and at least one cathode in a cell chamber, the "pen" apparatus can incorporate an electrical circuit within an integral circuit to measure the specific conductance of the water to be treated. Again refer to discussion of FIG. 1C above for exemplary details of a sensor package. Of course, not all of the sensor features shown in FIG. 1C are required, but rather, comprise optional features for enhancing performance of the present invention. For example, select features allow for a means for the operator to know if the water collected for treatment is suitable for drinking. In practice, the operator purges the "pen" cell with the source water to remove any residual brine or oxidant. In a preferred embodiment of the present invention, water is then taken into the cell chamber and the TDS circuit is activated. The TDS circuit activates a display or unique vibrating mode that indicates to the operator the quality of the source water. For water that is nominally below 1000 milligrams per liter (mg/L) TDS, the water is safe to drink. Further processing of the water may be required if the TDS is greater than 1000 mg/L. In a preferred embodiment of this disinfection "pen" apparatus, a circuit is included in integral circuit for measuring the TDS of the source water. Because TDS measurement is dependent on the temperature of the source water, a temperature measuring device is also incorporated in the cell chamber of the "pen".

Figure 4:
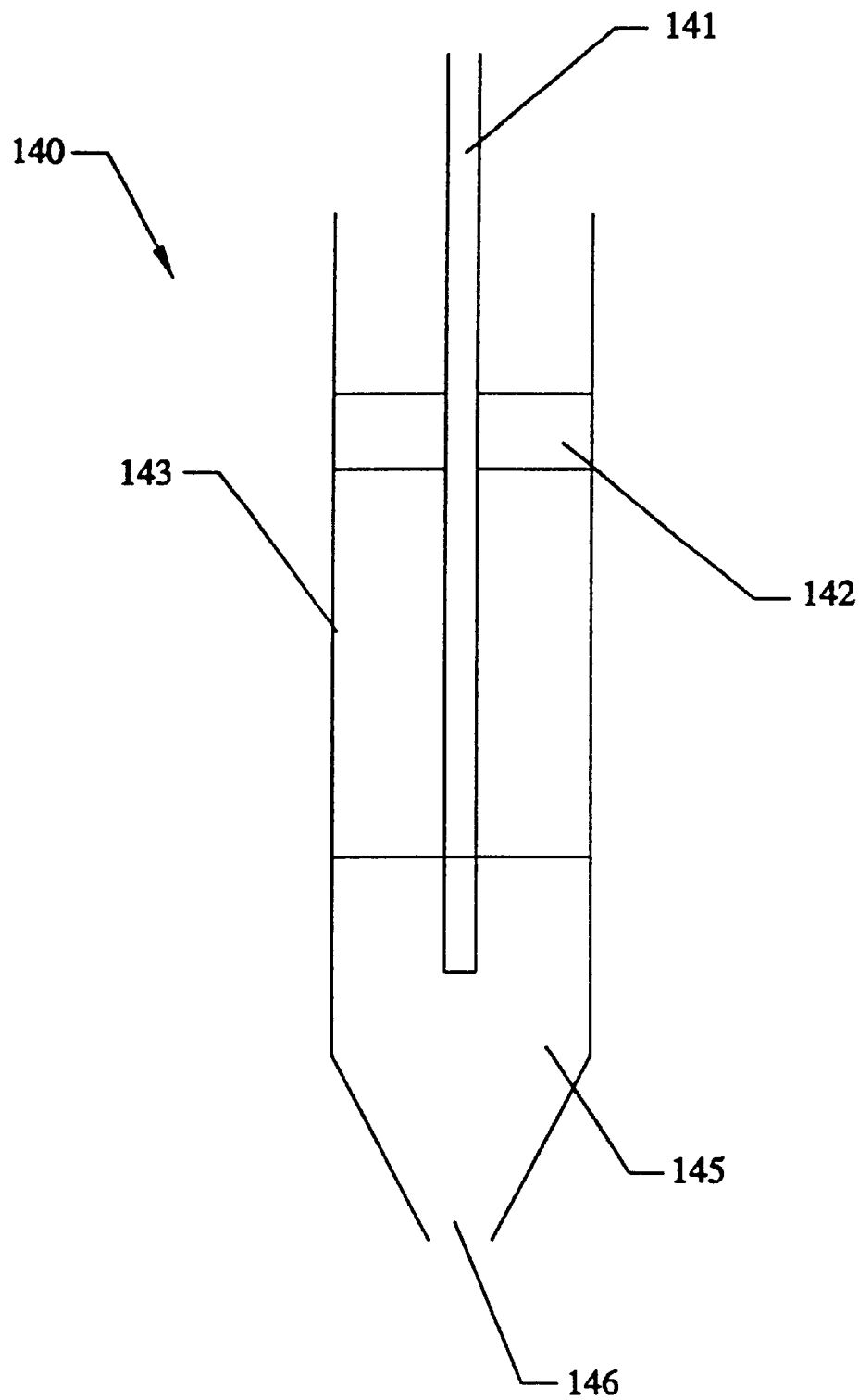
FIG. 4 is a cross-sectional view of another embodiment of the electrolytic cell used in the present invention.

In an alternative embodiment of the present invention, shown at 140 in FIG. 4, cathode 141 is fixed relative to seal 142, which together, move relative to anode 143. Hence, when the cathode assembly comprising cathode 141 and seal 142 moves downward, the treated brine is forced out of syringe-type apparatus 140 through opening 146. The same mechanism can be used to draw an aliquot of brine from a brine container into body 145 prior to passing current through the brine.

Figure 5:
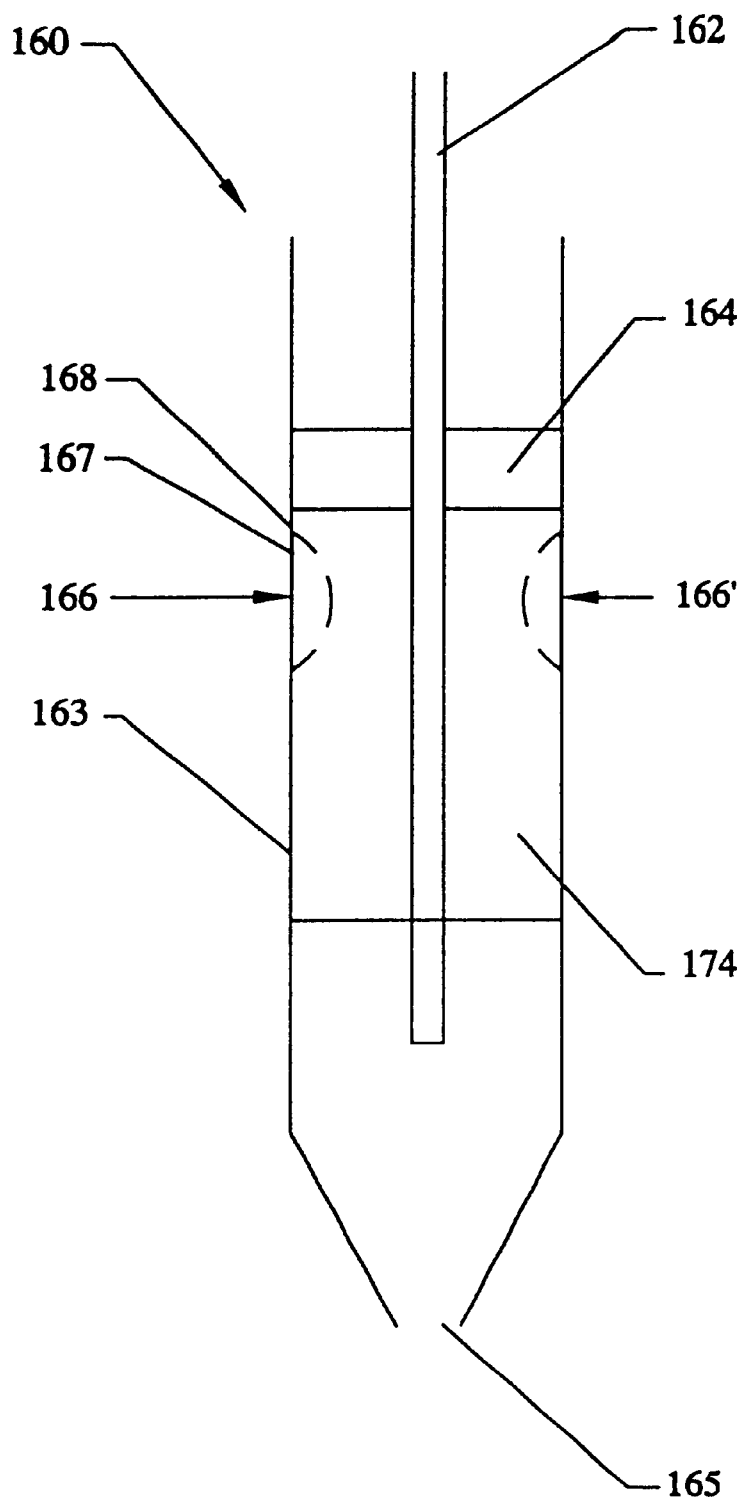
FIG. 5 is a cross-sectional view of another embodiment of the electrolytic cell used in the present invention.

In an alternative embodiment 160 of the present invention, shown in FIG. 5, cathode 162 and seal 164 remain fixed relative to anode 163. Deformable member 167 is disposed in the wall of anode 163. When pressure is applied to member 167 in the direction shown 166, 166', member 167 deforms inward at 168 thereby forcing the contents of anode chamber 163 out of body 174. When the pressure is relieved, air or liquid is sucked back into body 174.

As noted above, the amount of oxidant that is formed depends primarily on the total current that passes through the brine solution. Hence, the salt concentration and volume of brine treated do not directly determine the sterilization capacity of the treated brine. In a preferred embodiment of the present invention, the power source includes an energy storage device that is charged and then discharged through the brine solution. This arrangement assures reproducible oxidant generation.

Figure 6:
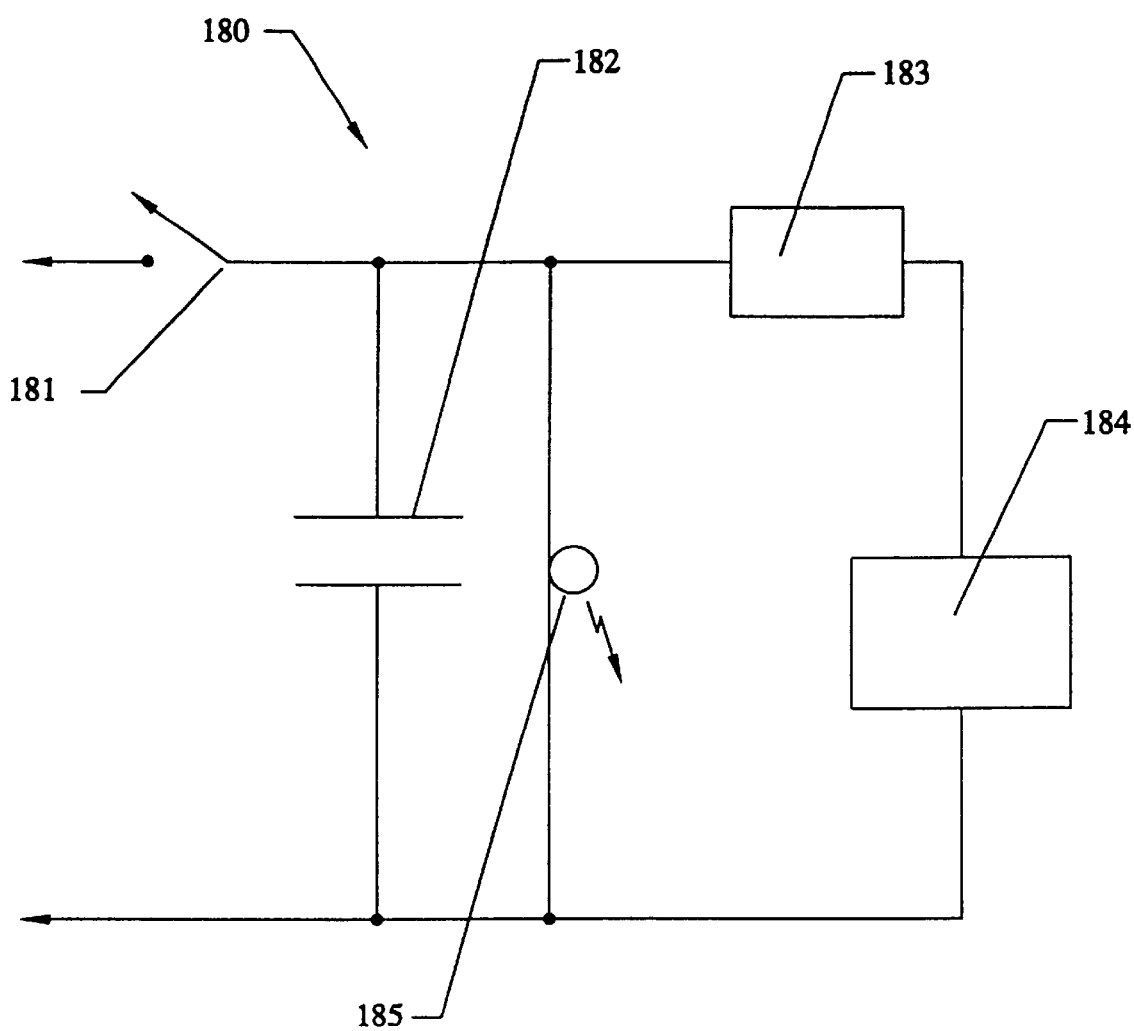
FIG. 6 is a schematic drawing of a power source for use in the present invention.

FIG. 6 is a schematic drawing of a preferred embodiment of power source 180 according to the present invention. Power source 180 comprises energy storage device 182, which is pumped to a predetermined voltage by charge pump 184. Voltage regulator 183 can be utilized to assure that the energy storage device is properly charged. Indicator 185 signals the user when the desired charge has been obtained. At this point, the user closes switch 181 thereby causing the energy storage device to discharge through the brine solution.

Charge pump 184 may utilize at least one battery. With battery power, a power conditioning circuit may be used to control power to the cell. In a preferred embodiment of the present invention, the power conditioning circuit includes a timing device such that once triggered by the operator, current is delivered to the cell. Once triggered, the circuit delivers energy to the cell until the proper amount of current is delivered. The circuit then activates a visual, audible, or tactile device, or other signaling device that notifies the operator that the oxidant is ready for introduction into the water to be treated. A mechanical device that converts mechanical motion to electricity is preferred. For example, charge pump 184 may be constructed from a permanent magnet that is caused to pass back in forth through a coil when the user shakes the pen back and forth. Similarly, a piezoelectric based actuator may be utilized to pump charge when a piezoelectric member is deformed by mechanical forces applied by the user. In another embodiment of the present invention, the power source for the disinfection "pen" can be an external source such as batteries, solar panels, manually driven electric generator, or any other means of delivering electrical power to the apparatus.

Figure 7:
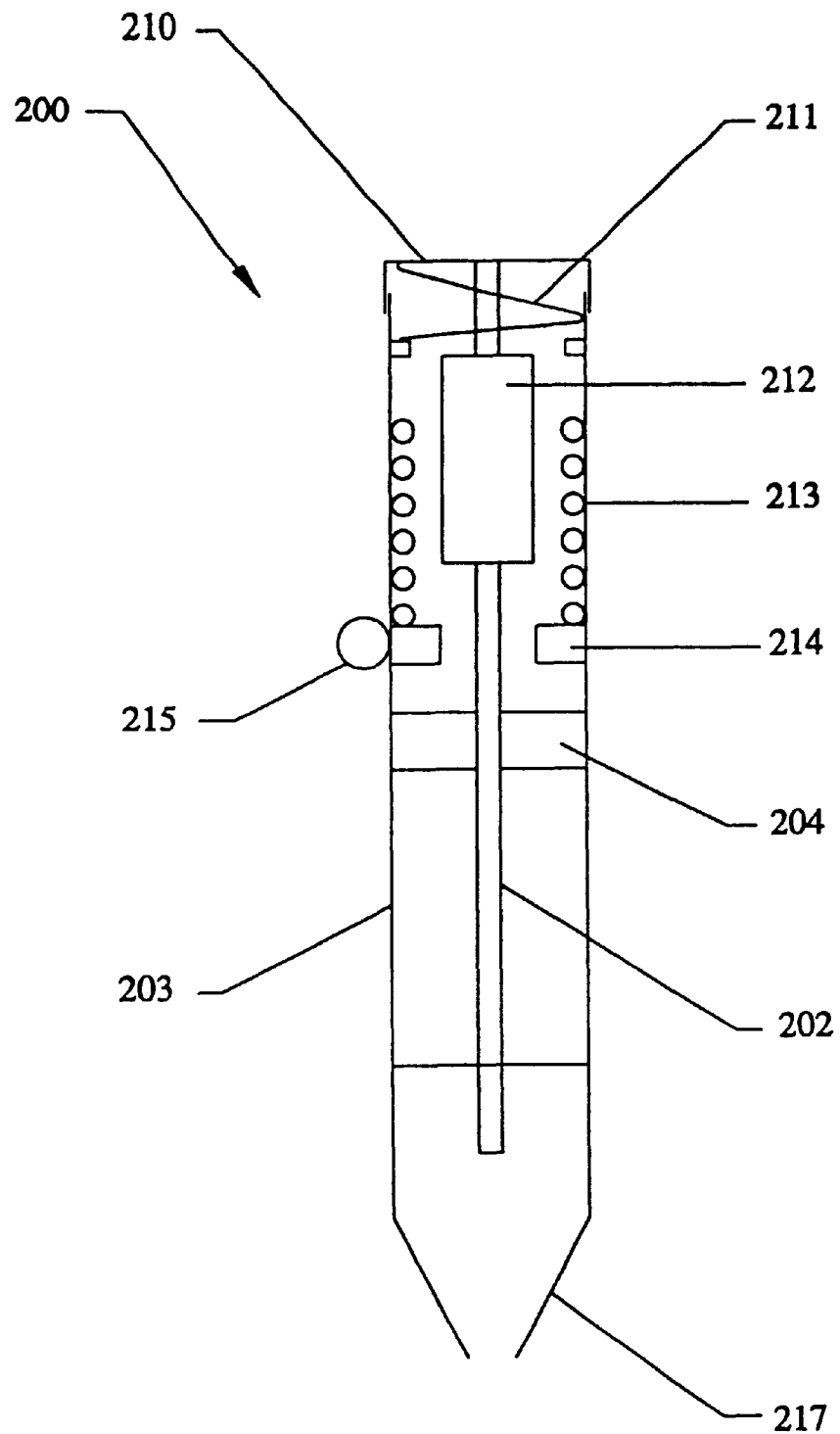
FIG. 7 is a cross-sectional view of an alternative embodiment of the present invention that utilizes a mechanical system for converting mechanical energy to charge an energy storage device shown in FIG. 6.

FIG. 7 is a cross-sectional view of an embodiment of the present invention that utilizes a mechanical system for converting mechanical energy to charge the energy storage device. Oxidant generator 200 comprises cathode 202, which moves with seal 204 within the body of the device. Upper portion of cathode 202 is attached to moveable cap 210, which slides relative to anode 203 when pressure is applied to cap 210. Return spring 211 causes cap 210 to move in the opposite direction when pressure is released. Magnet 212 is located on cathode 202 and moves therewith. Alternately, magnet 212 may move relative to cathode 202 via physical movement of the pen. The motion of cap 210 causes magnet 212 to move within coil 213 thereby generating a flow of electricity for charging a circuit in electronics assembly 214. When the energy storage device is fully charged, indicator 215 activates. A salt solution is then drawn into the body of the oxidant generator by pressing on cap 210, immersing end 217 in the brine, and then releasing cap 210. A switch on generator 200 discharges the stored energy through the brine. The oxidants generated by the discharge of the electrical energy are then expelled into the container of drinking water by again depressing cap 210.

The simplest method for generating brine involves dissolving conventional salt or salt tablets in a small amount of water. As noted above, the individuals who are most likely to use the present invention typically carry salt to replace salt lost through perspiration. Salt can be placed in a suitable container with an amount of water. After the salt dissolves, an aliquot of the salt solution is then poured or drawn into the electrolytic cell described above. The remaining salt solution may be ingested by the user to replace salt lost by perspiration. If this procedure is followed, the present invention does not require the user to carry any additional salt.

The present invention may also include a salt reservoir. In such embodiments, a reservoir having solid salt and brine compartment therein is provided as part of the oxidant generator. As noted above, the amount of oxidant generated is independent of the salt concentration over a wide range of concentrations. Accordingly, the salt reservoir only needs to assure that sufficient salt is introduced into the water drawn into the generator to put the salt concentration in the useable range.

Figure 8:
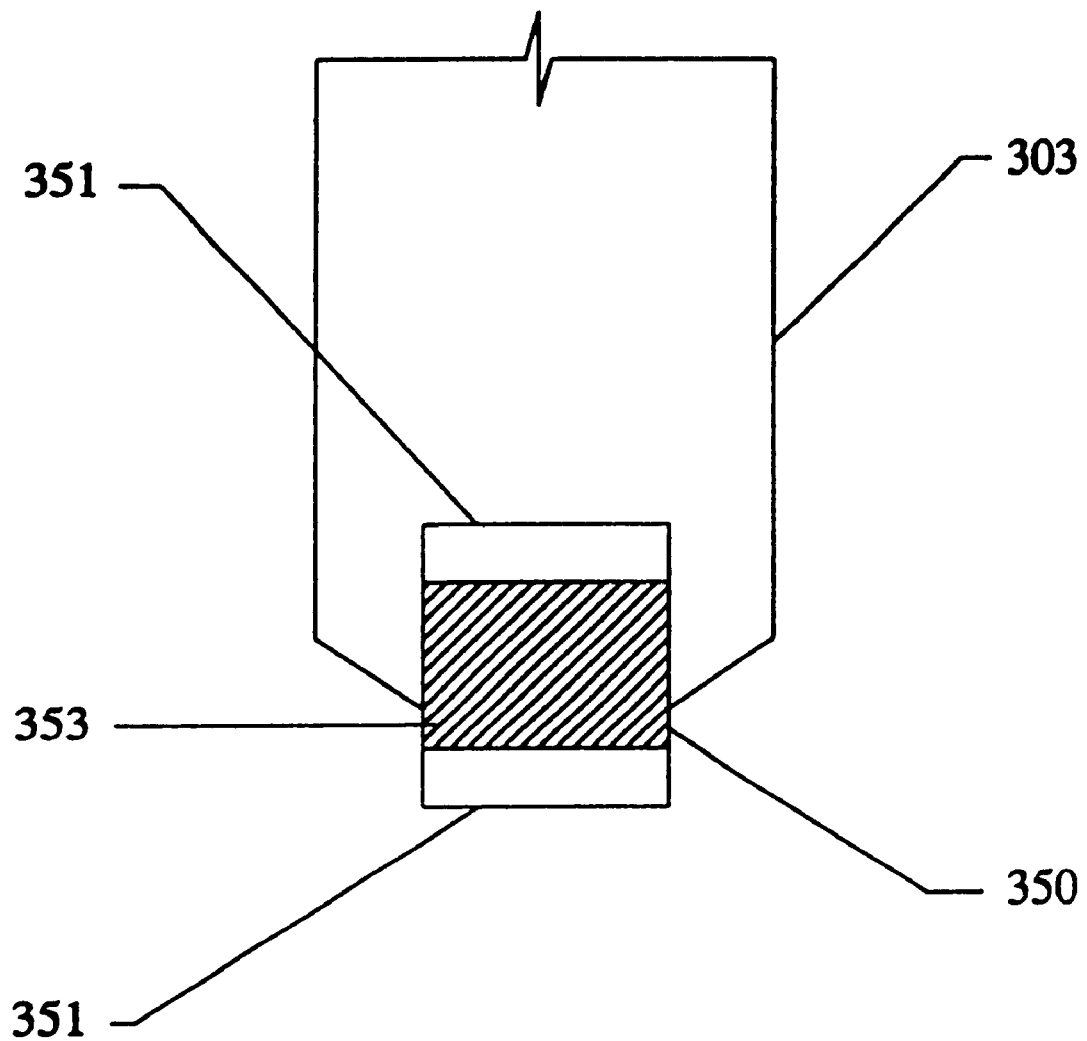
FIG. 8 is a cross-sectional view of an alternative embodiment of the present invention that utilizes a salt reservoir to generate the brine solution.

FIG. 8 illustrates an embodiment of the present invention, which includes a salt reservoir 350 which attaches at the end of cell chamber 303. Reservoir 350 has porous ends 351, which allow water to pass through reservoir 350 into the cell body. The porous ends retain salt 353. A portion of the salt dissolves when water is drawn into the chamber. After the charge is passed through the salt solution, the oxidants are expelled through the reservoir into the drinking water. When the salt in reservoir 350 is exhausted, the reservoir can be replaced by another disposable reservoir, or the reservoir can be refilled by the operator.

Figure 9:
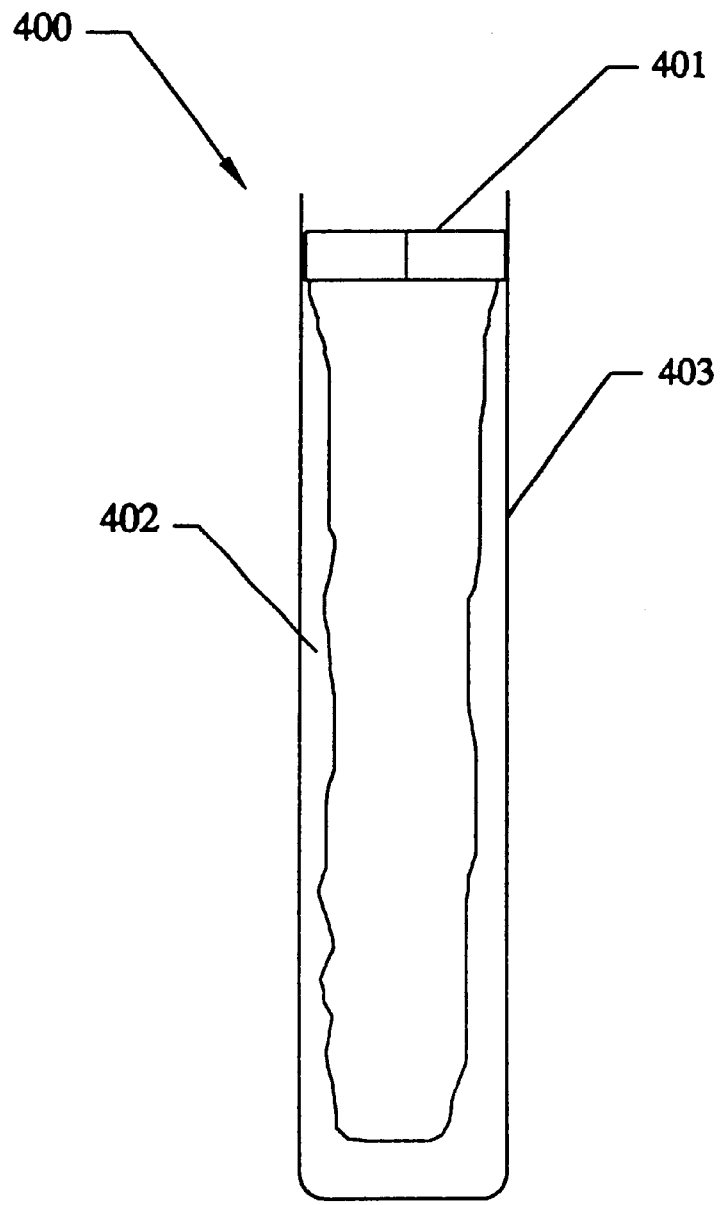
FIG. 9 is a cross-sectional view of an embodiment of the present invention that incorporates a brine capsule that is housed in the cap of the disinfection pen apparatus.

FIG. 9. shows an alternative embodiment at 400 which is otherwise attached to the body of the pen (e.g. see anode 101 in FIG. 1B) in the normal storage configuration. Cap 403 may house a brine storage container 402 with self sealing cap 401. Self sealing cap 401 can be an elastomer device, or mechanical check valve device or other device commonly known by those versed in the design of sealing mechanisms. Container 402 may be rigid or flexible. If rigid, the brine container may also be cap 403. The brine container contains a concentration of pure brine. To load cell chamber 100 (FIG. 1B) the "pen" tip enters through self sealing cap 401 and brine is drawn in the "pen" by any number of mechanisms described herein. When the "pen" is withdrawn, cap 401 re-seals. Brine container 402, or 403 (depending on configuration) can be a replaceable element to the disinfection "pen" apparatus.

The above-described embodiments of the present invention refer to an arrangement in which the cathode is a solid or tubular electrode within an outer body that acts as the anode and reaction chamber. However, it is obvious to those skilled in the art and from the preceding discussion that the cathode and anode can be reversed. Likewise, there may be multiple anodes and/or cathodes utilized in accordance with the present invention.

The above-described embodiments of the present invention optionally utilize a circuit to fix, signal, measure and/or control the amount of charge that passes through the salt solution. An alternative embodiment requires the operator to press the discharge switch for a certain length of time rather than rely on a circuit. However, it is obvious to those skilled in the art and from the preceding discussion that any charge indicating and/or integrating device may be used to determine that the minimum charge has passed through the salt solution. Alternatively, another aspect of the process is used to signal and/or determine when oxidant generation should be terminated, for example, but not limited to, residual oxidant and/or pressure generated.

Embodiments shown in the Figures generally show a reaction chamber comprising a cylindrical outer body with a concentric cathode electrode placed therein. However, it is obvious to those skilled in the art and from the preceding discussion that any chamber arrangement, which guarantees that the charge passes to the salt solution, may be utilized. For example, plate, pin, surface and/or other electrodes are within the scope of the present invention.

In another embodiment of the present invention, the cell chamber comprises at least one plate and preferably two plates wherein one plate serves as an anode, and the other as a cathode. During generation of the oxidant, ions generated are selectively attracted to either the anode or cathode plates. This process is described in U.S. Pat. No. 4,761,208 to Gram, et al entitled *Electrolytic Method and Cell for Sterilizing Water*, the teachings of which are incorporated herein by reference. By entering a flow dividing mechanism in the pen cell chamber between the anode and cathode plates, the anode and cathode product streams can be separated physically. By retaining the cathode stream from entering the water to be treated, the anode product only is used for disinfection. In a preferred embodiment, the anode product only has a lower pH concentration and stronger concentration of oxidants than that would provide enhanced disinfection effectiveness to the treated water source.

Figure 10:
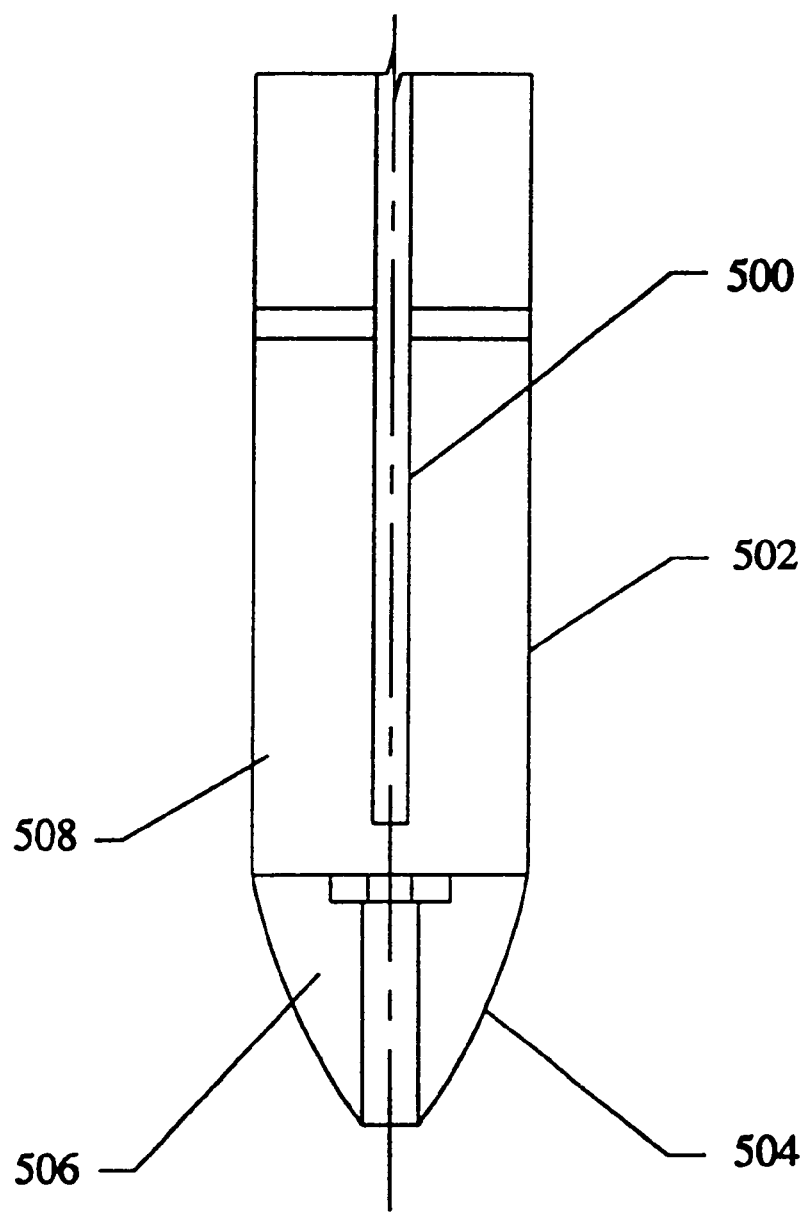
FIG. 10 is a cross-sectional view of an alternative embodiment of the present invention that shows a scraper mechanism in the tip of the disinfection pen to clean contaminants off of the cathode.

Because hardness, such as, but not limited to, calcium carbonate, is a common ingredient in most water sources, hardness is likely to be present in the water solution that is used to make the brine feed stock for the cell. During electrolysis, hardness comprising calcium carbonate is typically formed on the cathode of the cell due to the high pH conditions present at the cathode surface. Calcium carbonate buildup on the cathode surface coats the cathode and causes the electrolysis process to be ineffective in the production of oxidants. In larger disinfection systems, calcium is removed from the cell water feed stream with an ion exchange water softening system. This would be impractical for the size application of the present invention. In a preferred embodiment of the present invention, "pen" tip 504, shown in FIG. 10 comprises annular scraper mechanism 506 that wipes calcium carbonate off of the walls of cathode shaft 500 as the syringe-type device is compressed to draw brine into cell compartment 508.

Figure 11:
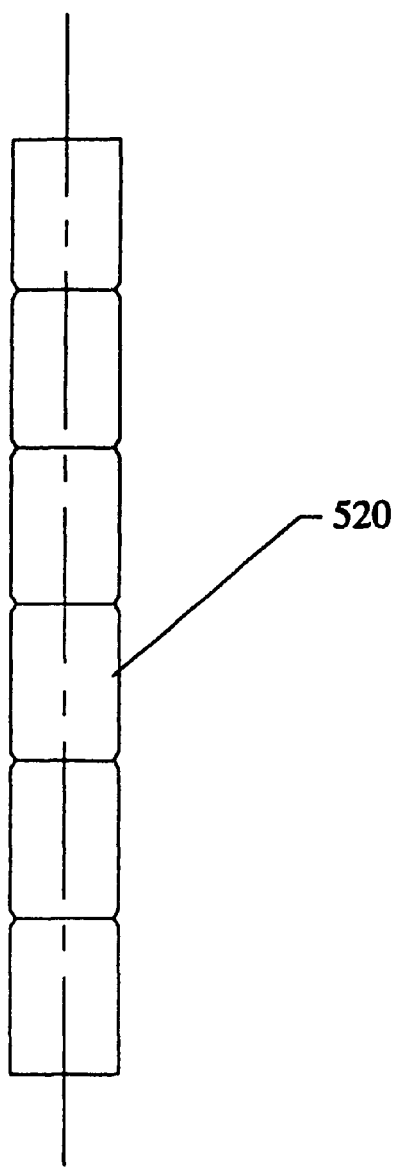
FIG. 11 is a cross-sectional view of an alternative embodiment of the present invention that shows the central cathode element of the apparatus with grooved segments.

In an alternative embodiment of the present invention, in order to eliminate calcium carbonate fouling, cathode shaft 520, such as shown in FIG. 11, comprises a multi-grooved shaft that is designed to have break-away segments. As each segment is "snapped off" by the operator, the shaft can be extended out of the elements of the syringe to expose new area of the cathode that has not been contaminated with calcium carbonate.

Figure 12:
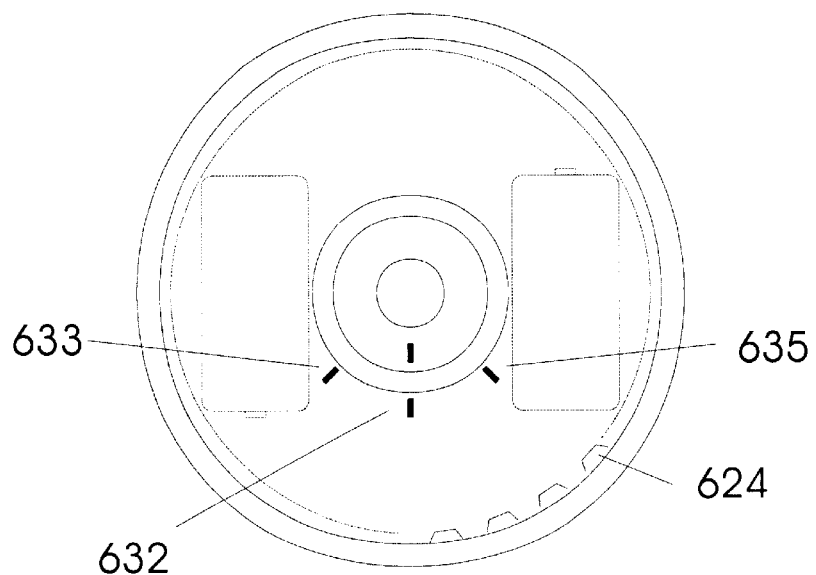
FIG. 12 is a cross-sectional view of an alternative embodiment of the present invention that shows the disinfection apparatus in the form of a cap.
Figure 12:
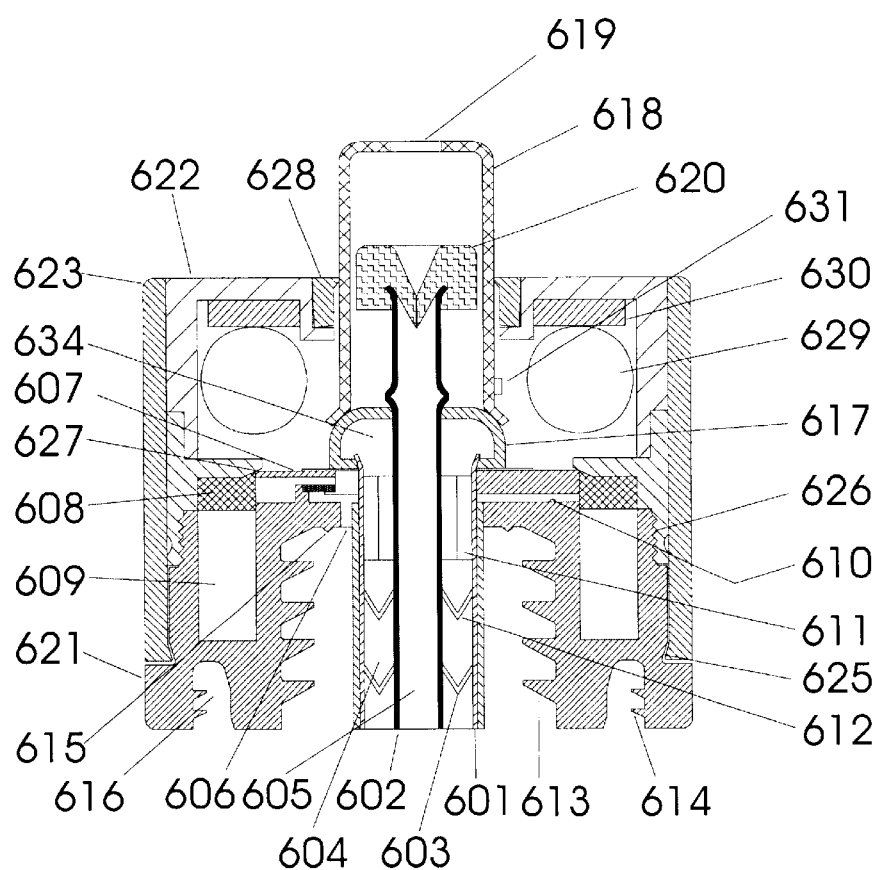

In an alternative embodiment of the disinfection apparatus of the present invention, shown in FIG. 12, the apparatus comprises a "cap" that fits on a container, water bottle, canteen, or other sealing device for a water container. Alternatively, the apparatus does not perform a typical cap function, but rather mounts on or resides within the container.

As shown in the cap embodiment of FIG. 12, an anode 601 comprises a tube, preferably comprising titanium, coated with an oxide material as described previously. A cathode 602 comprises an uncoated tube preferably constructed of titanium. Of course, alternative embodiments optionally comprise a plurality of anodes and/or a plurality of cathodes. A cell 604 comprising the annular space between the anode 601 and the cathode 602 is further bounded by one way seals 603, 612 which act as check valves to contain brine that is subsequently electrolyzed and converted to oxidant.

In this disinfection "cap" embodiment, shown in FIG. 12, the "cap" is attached to a standard military canteen via threads 613, to a standard bottle (e.g., a NALGENE® bottle—Nalge Corporation, Inc., Rochester, N.Y.) via threads 614, or to some other water container closure utilizing threads or other closure fixing device, such as, but not limited to, snap closures and the like. With the "cap" installed on the appropriate water container, water is driven through the hydraulic circuit via a manually activated pump comprising an elastomer diaphragm 617 and a pump plunger 618. On the compression stroke, the enclosed volume 634 within the diaphragm 617 is reduced in size thereby forcing the contents of the chamber 634 to exit via an annular spacer 611 and then through the check valve/one-way seal 612 and subsequently through the other check valve/one-way seal 603. On the return, or suction, stroke of the pump plunger 618, fluid is drawn in to the chamber 634 via a port 610. The action of the check valve/one-way seal 612 precludes fluid from being drawn in to the chamber 634 from the annular cell 604. Due to suction in the hydraulic circuit, water is drawn from the water storage container through a suction port 606, through another check valve 607, through an annular filter 608 and in to a brine (salt solution) compartment 609. The brine compartment 609 houses, for example, common sodium chloride salt. As fluid enters the brine compartment 609, it mixes with the salt and dissolves to make a sodium chloride brine. As the fluid progresses through the annular brine compartment 609, it is filtered by the annular brine filter 608 and exits annular the brine compartment 609 at the exit port 610. Brine exits the exit port 610 into the annular spacer 611, down through the annular check valve/one-way seal 612 and into the annular cell chamber 604.

In an alternative embodiment, the cap embodiment comprises a single set of threads rather than a plurality of threads. In such an alternative embodiment, for example, adapters are provided for adapting the cap to containers using different cap closures, for example, but not limited to, different threads and/or snap closures. Of course, such adapters are not limited to threaded adapters for fitting onto the cap. In a preferred embodiment of this alternative embodiment, a single set of threads allows for a smaller cap.

Referring again to FIG. 12, the pump plunger 618 also acts as a mechanism to activate a switch 631 that allows charge to flow to the annular electrolytic cell 604. In an alternative embodiment, the electrical switch 631 is separate from the pump plunger 618. The electrical switch 631 has multiple activation positions for different volumes of water treated. For example, a one-quart container is activated at one switch position 633 and is activated for a two-quart container at another switch position 635. The system is de-activated at an "off/lock" position 632. Larger quantities of water to be treated require proportionally more energy applied to the annular cell 604. In the preferred embodiment of this alternative configuration, electrical power is supplied by at least one battery 629 through a power regulating circuit 630.

For military applications, access to the contents of the water container is optionally achieved via a nuclear/biological/chemical (NBC) straw that minimizes the opportunity for contamination of the contents of the container. Certain applications in the outdoor enthusiast market comprises a straw and reap benefits therefrom. According to the alternative cap embodiment of the present invention, an elastomer seal 620 provides a seal with the cathode 602. The hollow center 619 of the plunger and the cathode 602 provides a passage for a straw to the contents inside the water storage container. Further, the contents of the water storage container are sealed with the disinfection "cap" at a seal 615 in the case of a standard military canteen, and at a seal 616 in the case of an industry standard NALGENE® water container. Other sealing features common to the industry will be evident to those versed in the art.

Routine maintenance of this particular alternative cap embodiment optionally comprises replacement of at least one battery and salt. Of course, alternative cap embodiments are not limited to at least one battery as an energy source, such embodiments optionally comprise at least one energy source, such as, but not limited to, solar energy, mechanical energy, fuel energy, and the like. Referring to FIG. 12, batteries 629 and salt in brine compartment 609 are accessible via removal of a housing 622 at threads 626. The brine compartment 609 is sealed with a thread housing 621 at a seal 627. Further, electronics 630 and the batteries 629 are sealed from the environment at the plunger 618 via a seal 628. Other sealing techniques for alternative configurations of the present invention are within the scope of the present invention and known to those versed in art of system packaging design.

Removal of the disinfection "cap" from the water storage container is achieved via unscrewing the complete assembly from the container. To preclude the housing 622 from rotating with respect to the thread housing 621 at the threads 626, a slip ring 623 interlocks the housing 622 with the thread housing 621 via ribbed grooves 624. The slip ring 623 is retained in the thread housing 621 via a detent groove 625. To access the batteries 629 and the brine compartment 609, the slip ring 623 is lifted out of the detent groove 625. With the slip ring 623 raised, the housing 622 is rotated at the threads 626 to disengage the housing 622 from the thread housing 621.

Of course, the cap embodiment is optionally configured to sizes smaller or larger depending on a variety of features, such as, number of thread sets, or other attachment mechanisms. For example, the inventive cap apparatus is optionally configured with a single set of threads to which a thread adapter fits. The thread adapter optionally comprises a non-thread side for attachment to a snap closure bottle or even to a pipe or tube. Likewise, the cap optionally comprises a closure mechanism other than threads to which an adapter fits. or the adapter optionally fits to a part of the cap other than the closure mechanism.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A portable oxidant generator comprising:
   at least one cell, said cell comprising at least two electrodes wherein at least one electrode comprises at least one cathode and at least one electrode comprises at least one anode;
   a control circuit for providing an electrical potential between at least one of said at least one cathode and at least one of said at least one anode, wherein said control circuit is in electrical contact with said at least one cathode and said at least one anode;
   an electrolyte solution for placement in said cell wherein said electrical potential causes a controlled electrical charge to pass through said electrolyte solution from said at least one cathode to said at least one anode, thereby generating at least one oxidant in said electrolyte solution;
   an energy source in electrical contact with said control circuit wherein said control circuit delivers a controlled electrical charge having a predetermined charge value.

2. The portable generator of claim 1 further comprising an annular cell, said annular cell comprising an inner annular surface and an outer annular surface.

3. The portable generator of claim 2 wherein said annular cell comprises at least one electrode positioned on said inner annular surface.

4. The portable generator of claim 2 wherein said annular cell comprises at least one electrode positioned on said outer annular surface.

5. The portable generator of claim 1 wherein at least one of said at least two electrodes comprises at least one catalyst.

6. The portable generator of claim 5 wherein said at least one catalyst comprises at least one member selected from the group consisting of Group VIIIB element of the Periodic Table of Elements and compounds thereof.

7. The portable generator of claim 5 wherein said at least one catalyst comprises ruthenium oxide.

8. The portable oxidant generator of claim 1 wherein said energy source comprises one source selected from the group consisting of mechanical sources, chemical sources, magnetic sources, pressure sources, and electromagnetic sources.

9. The portable generator of claim 1 wherein said circuit measures the electrical charge passed to said electrolyte solution.

10. The portable generator of claim 1 further comprising an output device for outputting information.

11. The portable generator of claim 10 wherein said output device for outputting information comprises at least one output selected from the group consisting of tactile, auditory, olfactory and visual outputs.

12. The portable generator of claim 10 wherein said information comprises at least one type of information selected from the group consisting of electrical charge, energy level, remaining energy, electrolyte level, remaining electrolyte, integrity of said portable generator, temperature, total dissolved solids, conductivity, pH, ion concentration, residual oxidant, and oxidation-reduction potential.

13. The portable generator of claim 1 further comprising a circuit for measuring at least one condition selected from the group consisting of temperature, total dissolved solids, conductivity, pH, ion concentration, residual oxidant, and oxidation-reduction potential.

14. The portable generator of claim 13 wherein said circuit for measuring at least one condition provides information to a circuit as in claim 1 for providing an electrical potential between said anode and said cathode.

15. The portable generator of claim 1 wherein said cell comprises a reservoir.

16. The portable generator of claim 1 further comprising at least one reservoir.

17. The portable generator of claim 16 wherein said at least one reservoir comprises an electrolyte reservoir.

18. The portable generator of claim 16 wherein said at least one reservoir comprises a salt reservoir.

19. The portable generator of claim 16 wherein said at least one reservoir comprises a refillable reservoir.

20. The portable generator of claim 16 wherein said at least one reservoir comprises a disposable reservoir.

21. The portable generator of claim 16 wherein said at least one reservoir comprises a self-sealing reservoir.

22. The portable generator of claim 21 wherein said self-sealing reservoir comprises a seal selected from the group consisting of an elastomer and a mechanical check valve.

23. The portable generator of claim 1 further comprising at least one deposit removing apparatus.

24. The portable generator of claim 23 wherein said at least one deposit removing apparatus comprises an apparatus selected from the group consisting of a scraper and a shaft comprising break-away segments.

25. The portable oxidant generator of claim 1 further comprising a housing.

26. The portable generator of claim 25 wherein said housing comprises a tube, said tube comprising at least one cross-section selected from the group consisting of circular, ellipsoidal, and polygonal.

27. The portable generator of claim 26 wherein said tube comprises a length between approximately 3 cm and approximately 60 cm.

28. The portable generator of claim 26 wherein said tube comprises a width between approximately 0.5 cm and approximately 30 cm.

29. The portable generator of claim 25 further comprising a clip for clipping said housing to an object.

30. The portable generator of claim 25 wherein said housing comprises a cap.

31. The portable generator of claim 30 wherein said cap comprises at least one set of threads.

32. The portable generator of claim 30 wherein said cap comprises at least one aperture for insertion of a drinking utensil.

33. The portable oxidant generator of claim 25 wherein said housing further comprises a delivery mechanism.

* * * * *